United States Patent
Zhou et al.

(10) Patent No.: US 12,352,883 B2
(45) Date of Patent: *Jul. 8, 2025

(54) ACCURACY AND LATENCY IMPROVEMENTS FOR REL-17 NR POSITIONING

(71) Applicant: Samsung Electronics Co., Ltd., Suwon-si (KR)

(72) Inventors: Yuhan Zhou, San Diego, CA (US); Philippe Sartori, Naperville, IL (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/751,191

(22) Filed: Jun. 21, 2024

(65) Prior Publication Data

US 2024/0345204 A1 Oct. 17, 2024

Related U.S. Application Data

(63) Continuation of application No. 17/709,406, filed on Mar. 30, 2022, now Pat. No. 12,025,725, which is a
(Continued)

(51) Int. Cl.
*G01S 5/10* (2006.01)
*G01S 11/06* (2006.01)
(Continued)

(52) U.S. Cl.
CPC .............. *G01S 5/10* (2013.01); *G01S 11/06* (2013.01); *H04L 5/0051* (2013.01); *H04W 56/0055* (2013.01); *H04W 64/006* (2013.01)

(58) Field of Classification Search
CPC .......... G01S 5/10; G01S 11/06; G01S 5/0236; G01S 5/0036; G01S 5/0205;
(Continued)

(56) References Cited

U.S. PATENT DOCUMENTS

| 11,576,143 B2 * | 2/2023 | Bao ...................... H04W 24/10 |
| 2014/0228051 A1 * | 8/2014 | Siomina ................ H04W 64/00 455/456.1 |

(Continued)

FOREIGN PATENT DOCUMENTS

WO 2020068295 A1 4/2020

OTHER PUBLICATIONS

Corrected Notice of Allowability for U.S. Appl. No. 17/709,394, mailed Oct. 25, 2023.
(Continued)

*Primary Examiner* — Kabir A Timory
(74) *Attorney, Agent, or Firm* — Renaissance IP Law Group LLP

(57) ABSTRACT

A system and methods are disclosed for reducing Rx/Tx timing errors in a wireless network for latency of positioning measurements. Additionally, a system and methods are disclosed for increasing positioning accuracy by mitigating NLOS errors and/or by performing two-stage beam sweeping for DL-AoD. Further, a system and methods are disclosed for performing M-sample positioning measurements to improve latency reporting in connection with positioning reporting.

14 Claims, 6 Drawing Sheets

Related U.S. Application Data continuation of application No. 17/709,394, filed on Mar. 30, 2022, now Pat. No. 11,965,975.

(60) Provisional application No. 63/225,870, filed on Jul. 26, 2021, provisional application No. 63/182,758, filed on Apr. 30, 2021.

(51) Int. Cl.
  *H04L 5/00* (2006.01)
  *H04W 56/00* (2009.01)
  *H04W 64/00* (2009.01)

(58) Field of Classification Search
  CPC ........ G01S 5/0273; G01S 5/0027; G01S 5/06; G01S 2205/007; G01S 2205/008; H04L 5/0051; H04L 5/0048; H04L 5/0053; H04L 5/0044; H04W 56/0055; H04W 64/006; H04W 4/029; H04W 64/00; H04W 24/10; H04B 17/309; H04B 17/318
  See application file for complete search history.

(56) References Cited

U.S. PATENT DOCUMENTS

| | | |
|---|---|---|
| 2015/0289141 A1 | 10/2015 | Ghasemzadeh et al. |
| 2018/0017661 A1 | 1/2018 | Morioka |
| 2021/0051622 A1 | 2/2021 | Manolakos et al. |
| 2021/0099832 A1 | 4/2021 | Duan et al. |
| 2021/0239783 A1 | 8/2021 | Calcev et al. |
| 2021/0360461 A1 | 11/2021 | Duan et al. |
| 2021/0360577 A1 | 11/2021 | Manolakos et al. |
| 2021/0377698 A1 | 12/2021 | Manolakos et al. |
| 2022/0308153 A1* | 9/2022 | Fakoorian ............. H04W 24/08 |
| 2023/0041484 A1 | 2/2023 | Liu et al. |

OTHER PUBLICATIONS

Ericsson, FL Summary #1 for AI 8.5.3 Accuracy Improvements for DL-AoD Positioning, 3GPP Draft; R1-2103865, 3rd Generation Partnership Project (3GPP), vol. RAN WG1, No. e-Meeting, 2021, 41 pages.

European Extended Search Report for Application No. 22169030.8, mailed Sep. 23, 2022.

European Office Action for Application No. 22169030.8, mailed Feb. 20, 2025.

Nokia et al., "Views on Potential Positioning Enhancements," 3GPP Draft; R1-2008301, 3rd Generation Partnership Project (3GPP), vol. RAN WG1, 2020, 13 pages.

Notice of Allowance for U.S. Appl. No. 17/709,394, mailed Oct. 16, 2023.

Notice of Allowance for U.S. Appl. No. 17/709,406, mailed Feb. 21, 2024.

Office Action for U.S. Appl. No. 17/709,394, mailed Jun. 5, 2023.

Office Action for U.S. Appl. No. 17/709,406, mailed Aug. 31, 2023.

Vivo, "Discussion on Methods for Rx/Tx Timing Delay Mitigating," 3GPP Draft; R1-21 02526, 3rd Generation Partnership Project (3GPP), vol. RAN WG1, No. e-Meeting, 2021, 15 pages.

* cited by examiner

ACCURACY AND LATENCY IMPROVEMENTS FOR REL-17 NR POSITIONING

CROSS-REFERENCE TO RELATED APPLICATIONS

This application is a continuation of U.S. patent application Ser. No. 17/709,406, filed Mar. 30, 2022, now allowed, which is a continuation of U.S. patent application Ser. No. 17/709,394, filed Mar. 30, 2022, now U.S. Pat. No. 11,965,975, issued Apr. 23, 2024, which claims the priority benefit under 35 U.S.C. § 119(e) of U.S. Provisional Patent Application Ser. No. 63/182,758, filed Apr. 30, 2021, and U.S. Provisional Patent Application Ser. No. 63/225,870, filed Jul. 26, 2021, the disclosures of which are incorporated herein by reference in their entirety.

TECHNICAL FIELD

The subject matter disclosed herein relates to wireless networks. More particularly, the subject matter disclosed here relates to a system and a method for improving accuracy and latency for positioning in a wireless network.

BACKGROUND

New Radio (NR) positioning may be standardized in Release 16 (Rel-16) of the 3rd Generation Partnership Project (3GGP) to meet the basic positioning requirements of regulators and to cover some commercial cases. In Release 17 (Rel-17) of the 3GGP, the positioning requirements to meet may include general commercial-use cases having a sub-meter level position accuracy of less than 1 m, and industrial internet-of-things (IIoT) use cases having a position accuracy of less than 0.2 m. The target latency requirement is less than 100 ms. For some IIoT use cases, latency in the order of 10 ms is desired.

SUMMARY

An example embodiment provides a method for Non-Line of Sight (NLOS) determination in a wireless network in which the method may include: performing, at a User Equipment (UE), a measurement for positioning; determining, at the UE, an indication whether the measurement for positioning is based on Line-of-Sight (LOS) or NLOS conditions; and reporting, by the UE, the indication in which the indication may include a hard decision based on binary values or a soft decision based on a probability that a detected path for the measurement for positioning is a LOS path or a NLOS path. In one embodiment, the UE may be configured to report the indication associated the hard decision or the soft decision. In another embodiment, the method may further include: receiving, at the UE, an assignment of a UE/TRP timing window for the UE and a Transmit/Receive Point (TRP) associated with the UE; performing, at the UE, a second measurement for positioning based on a first arrival path signal that arrives at the UE during the UE/TRP timing window; and sending, by the UE, second measurement information for the second measurement for positioning based on the first arrival path signal. In still another embodiment, the second measurement information may include a Reference Signal Time Difference (RSTD) measurement, a Receive-Transmit (Rx-Tx) Time difference measurement, or a Reference Signal Received Power (RSRP) measurement. In yet another embodiment, the method may further include measuring, at the UE, an additional one or more detected path signals that arrive at the UE during the UE/TRP timing window besides the first arrival path signal.

An example embodiment provides a method to provide an association between an Uplink (UL) Sounding Reference Signal (SRS) resource in a wireless network and a UE Transmission (Tx) Timing Error Group (Tx TEG) in which the method may include: sending in the wireless network, by a UE, a first indication of a first capability of the UE to associate a UL SRS resource with a Tx TEG of the UE; receiving, at the UE, a request to report association information of SRS resource with the Tx TEG; and sending, by the UE through a Physical Uplink Shared Channel (PUSCH) of the wireless network, information associating the UL SRS with the Tx TEG. In one embodiment, the PUSCH and the SRS are in a same subframe, and the UE further provides the information associating the UL SRS with the Tx TEG to the wireless network. In another embodiment, the method may further include sending, by the UE, a second indication of a second capability of the UE to provide the information associating a Receive-Transmit (Rx-Tx) time difference measurement with a Receive and Transmit Timing Error Group (RxTx TEG).

An example embodiment provides a system in a wireless network in which the system may include a UE configured to send to the wireless network an indication of a capability of the UE to associate a UL SRS resource of the wireless network with a Tx TEG of the UE in which the UE may be further configured to receive from the wireless network a request to report the Tx TEG, and to send to the wireless network association information of the UL SRS with the Tx TEG through a PUSCH. In one embodiment, the PUSCH and the SRS are in a same subframe. In another embodiment, the TEG further may include information for a RxTx TEG to the UE.

An example embodiment provides a system in a wireless network in which the system may include a UE configured to provide an indication to the wireless network whether a measurement for positioning is based on LOS or NLOS conditions, and the indication may include a hard decision based on binary values or a soft decision based on a probability that a detected path for the measurement for positioning is a LOS path or a NLOS path. In one embodiment, the UE may receive an assignment of a UE/TRP timing window for the UE and the TRP, and the UE may be further configured to perform a second measurement for positioning based on a first arrival path signal that arrives at the UE during the UE/TRP timing window and to send a report of the second measurement for positioning. In one embodiment, the report may include information for a RSTD measurement, a Rx-Tx Time difference measurement, or a RSRP measurement. In another embodiment, the UE may be further configured to perform the measurement for positioning based on an additional one or more detected path signals that arrive at the UE during the UE/TRP timing window besides the first arrival path signal.

An example embodiment provides a method to measure position information in a wireless network in which the method may include: sending, by a UE, an indication that the UE is capable a positioning measurement using fewer than four measurement samples; receiving, at the UE, a request to make one or more positioning measurements using fewer than four measurement samples or using four measurement samples; and sending, by the UE, a measurement report that includes a number of measurement samples used to make the positioning measurement. In one embodiment, the indication that the UE is capable of a positioning measurement with four measurement samples or less than four samples may be further based on one or more reported UE capabilities. In another embodiment, the request to make the one or more positioning measurements may be for a Downlink Time Different of Arrival (DL-TDOA) measurement, a multi-cell Round Trip Time (Multi-RTT) measurement, or a Downlink Angle of Departure (DL-AoD) measurement. In still another embodiment, the measurement report may include a RSTD measurement, a UE Rx-Tx time difference measurement, or a Positioning Reference Signals-Reference Signal Received Power (PRS-RSRP) measurement. In yet another embodiment, the method may further include receiving, at the UE, a Configured Grant (GC) type 1 message containing a configuration for the measurement report.

An example embodiment provides a method to measure position information in a wireless network in which the method may include: receiving, by a UE, an indication that the wireless network can accept a positioning measurement based on four samples or less samples; performing, by the UE, a positioning measurement using fewer than four measurement samples or using four measurement samples; and sending, by the UE, a measurement report that includes a number of measurement samples used to make the positioning measurement. In one embodiment, the indication that the UE is capable of a positioning measurement with four measurement samples or less than four samples may be further based on one or more reported UE capabilities. In another embodiment, the positioning measurement may be for a DL-TDOA measurement, a Multi-RTT measurement, or a DL-AoD measurement. In still another embodiment, the measurement report may include a RSTD measurement, a UE Rx-Tx time difference measurement, or a PRS-RSRP measurement. In yet another embodiment, the method may further include receiving, at the UE, a GC type 1 message containing a configuration for the measurement report.

An example embodiment provides a system in a wireless network in which the system may include: a UE configured to send to the wireless network an indication that the UE is capable of making a measurement for positioning using fewer than four measurement samples in which the UE may be further configured to receive a request from the wireless network to make a measurement for positioning using fewer than four measurement samples or using four measurement samples, and to send to the wireless network a measurement report that may include a number of measurement samples used to make the measurement for positioning. In one embodiment, the request to make the measurement for positioning may be for a DL-TDOA measurement, a Multi-RTT measurement, or a DL-AoD measurement. In another embodiment, the measurement for positioning made by UE may include a RSTD measurement, a UE Rx-Tx time difference measurement, or a PRS-RSRP measurement. In still another embodiment, the UE may be further configured to receive a GC type 1 message containing a configuration for a report to be used by the UE for a measurement for positioning.

An example embodiment provides a system in a wireless network in which the system may include: a UE configured to send to the wireless network an indication that the UE is capable of making a measurement using fewer than four measurement samples, and the UE further configured to determine a number of samples used for a positioning measurement, to make the positioning measurement, and to send to the wireless network a measurement report including the number of samples used to make the positioning measurement. In one embodiment, the positioning measurement is for a DL-TDOA measurement, a Multi-RTT measurement, or a DL-AoD measurement. In another embodiment, the positioning measurement made by UE may include a RSTD measurement, a UE Rx-Tx time difference measurement, or a PRS-RSRP measurement. In still another embodiment, the UE may be further configured to receive a GC type 1 message containing a configuration for a report to be used by the UE for the positioning measurement.

An example embodiment provides a system in a wireless network in which the system may include: a UE configured to receive from the wireless network a request to perform a RSRP measurement on a specific set of Positioning Reference Signal (PRS) resources that belongs to two different PRS resource lists from a TRP in which the specific set of PRS resources may be different from a second set of PRS resources and, in response, to measure the RSRP measurement on the specific set of PRS resources and to send the RSRP measurement on the specific set of PRS resources to the wireless network. In one embodiment, the specific of PRS resources may include wide beam resources and the second set of PRS resources may include narrow beam resources. In another embodiment, the specific set of PRS resources may be quasi co-located (QCLed) with the second set of PRS resources.

BRIEF DESCRIPTION OF THE DRAWING

In the following section, the aspects of the subject matter disclosed herein will be described with reference to exemplary embodiments illustrated in the figure, in which.

DETAILED DESCRIPTION

Figure 1B:
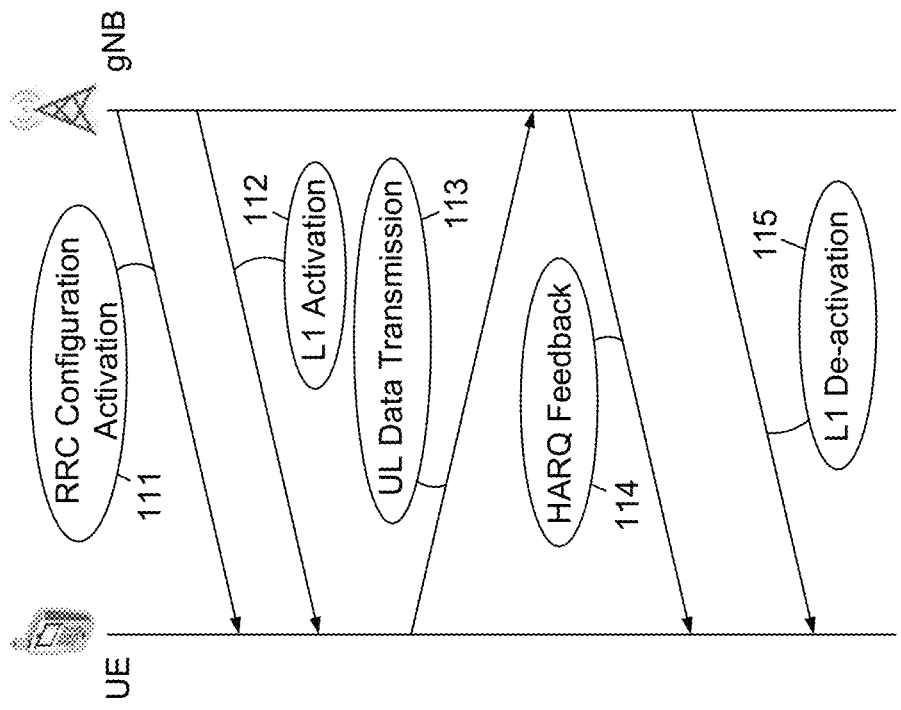
FIG. 1B depicts a signal flow for a Configured Grant Type 2 in which an uplink grant may be provided by Physical Downlink Control Channel (PDCCH), and stored or cleared as a configured uplink grant.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-a-chip (SoC), an assembly, and so forth.

In order to address the higher-accuracy, lower-latency positioning, and high integrity and reliability requirements resulting from new applications for Rel-17, the following working objectives may be set for Rel-17:

---

Specify methods, measurements, signaling, and procedures for improving positioning accuracy of the Rel-16 NR positioning methods_by mitigating User Equipment (UE) Reception (Rx)/Transmission (Tx) and/or (next generation node b) gNB Rx/Tx timing delays, including -continued Download (DL), Upload (UL) and DL + UL positioning methods
UE-based and UE-assisted positioning solutions
Specify the procedure, measurements, reporting, and signaling for improving the accuracy of
UL Angle of Arrival (AoA) for network-based positioning solutions.
DL- Angle of Departure (AoD) for UE-based and network-based (including UE-assisted) positioning solutions.
Specify the enhancements of signaling, and procedures for improving positioning latency of the Rel-16 New Radio (NR) positioning methods, for DL and DL + UL positioning methods, including:
Latency reduction related to the request and response of location measurements or location estimate and positioning assistance data;
Latency reduction related to the time needed to perform UE measurements;
Latency reduction related to the measurement gap;
Study and specify the enhancements of information reporting from UE and gNB for multipath/NLOS mitigation UE and gNB Rx/Tx Timing Error for Positioning For both User Equipment (UE) and Next Generation NodeBs (gNBs), a large portion of RX/TX timing delays may be pre-calibrated for supporting transmission and reception of positioning reference signals. There may, however, be remaining RX/TX timing errors after a pre-calibration. Additionally, different Rx/Tx antenna panels and RF chains may have the same or different RX/TX timing errors. In order to capture the timing errors, Timing Error Groups (TEG) may be introduced. More specifically, the concept of Rx/TX timing errors and timing error groups may be formally defined as follows.

UE Tx "Timing Error Group" (UE Tx TEG): A UE Tx TEG may be associated with transmissions of one or more Uplink Sounding Reference Signal (UL SRS) resources for the positioning purpose, which may have Tx timing errors within a certain margin.

TRP Tx "Timing Error Group" (TRP Tx TEG): A transmission point (TRP) Tx TEG may be associated with the transmissions of one or more DL positioning reference signal (PRS) resources, which may have Tx timing errors within a certain margin.

UE Rx "Timing Error Group" (UE Rx TEG): A UE Rx TEG may be associated with one or more Downlink (DL) measurements, which may have Rx timing errors within a certain margin.

TRP Rx "Timing Error Group" (TRP Rx TEG): A TRP Rx TEG may be associated with one or more UL measurements, which may have Rx timing errors within a margin.

Some embodiments disclosed herein may support the following, which is related to TEG:

Support the following for mitigating TRP Tx timing errors and/or UE Rx timing errors for DL Time Difference of Arrival (TDOA)
Support a UE to provide the association information of Reference Signal Time Difference (RSTD) measurements with UE Rx TEG(s) to the LMF when the UE reports the RSTD measurements to the Location Management Function (LMF) if the UE has multiple TEGs.
Support a TRP providing the association information of DL PRS resources with Tx TEGs to the LMF if the TRP has multiple TEGs.
Support the LMF to provide the association information of DL PRS resources with Tx TEGs to a UE for UE-based positioning if the TRP has multiple TEGs.
[1] Support the following for mitigating UE Tx timing errors and/or TRP Rx timing errors for UL TDOA.
Support a TRP to provide the association information of RTOA measurements with TRP Rx TEG(s) to the LMF when the TRP reports the Reference Time of Arrival (RTOA) measurements to the LMF if the TRP has multiple Rx TEGs.
Support a UE to provide under capability the association information of UL Sounding Reference Signals (SRS) resources for positioning with Tx TEGs to the LMF if the UE has multiple Tx TEGs, and further may include:
Whether to support a UE to provide the association information of UL SRS resources for Multiple-Input Multiple-Output (MIMO) with Tx TEGs to the LMF if the UE has multiple Tx TEGs
Whether the association information may be sent directly from UE to LMF, or may be first provided to gNB and then forwarded to LMF.

[2] For mitigating UE/TRP Tx/Rx timing errors for DL + UL positioning, support at least one of the following alternatives:
    Alt. 1: Support a UE to provide the association information of a UE Rx-Tx time difference measurement with a pair of {Rx TEG, Tx TEG} to LMF, where the Rx TEG may be used to receive the DL PRS and the Tx TEG may be used to transmit the UL Positioning SRS;
    Alt. 2: Support a UE to provide the association information of a UE Rx-Tx time difference measurement with a UE RxTx TEG to LMF according to the one of the 2 following options:
        Option 1: the UE RxTx TEG may be associated with one or more {DL PRS resource, UL Positioning SRS resource} pairs.
        Whether UE provides the association information of DL PRS resources to UE Rx TEG to LMF for UE RxTx measurements specifically.
        Option 2: the UE RxTx TEG may be associated with one or more {Rx TEG, Tx TEG} pairs where the Rx TEG may be used to receive the DL PRS and the Tx TEG may be used to transmit the UL Positioning SRS.
    For both alternatives, the UE may provide the association information of SRS resources for positioning to UE Tx TEG to LMF
    Whether the association information may be sent directly from UE to LMF, or may be first provided to gNB and then forwarded to LMF.

Accuracy Improvement for DL-AoD Positioning

The measurement and reporting procedure for a gNB and a UE in Rel-16 Downlink Angle of Departure (DL-AoD) may be improved for higher accuracy. Specifically, some embodiment disclosed herein may support the following, which relates to DL-AoD positioning:

Support for angle calculation enhancement for DL-AoD:
    Support gNB providing the beam/antenna information to the LMF.
    The gNB beam/antenna information can be provided to the UE for UE-based DL-AoD.
    Note: The antenna information may be related to reducing the overhead of beam information.
Support for the following enhancements under UE capability for both UE-B and UE-A DL-AOD positioning methods:
    Enhancing the signaling to UE for the purpose of PRS resource(s) measurement and (for UE-A) report
    The detailed signaling (e.g., the boresight direction for UE-A DL-AoD, further spatial information of PRS resources, processing prioritization of PRS resources).
    Furthermore, following options may include:
        Option 1: Enhancing the reporting to include the measurements of adjacent beams PRS resources that related with each other indicated by the assistance data.
        Option 2: UE can be requested to measure and report on specific PRS resources.
For the purpose of both UE-B and UE-A DL-AoD, and with regards to the support of AOD measurements with an expected uncertainty window, study further whether to support at most one of the following options:
    Option 1: Indication of expected DL-AoD/Zenith-of-Departure (ZoD) value and uncertainty (of the expected DL-AoD/ZoD value) range(s) may be signaled by the LMF to the UE.
    Single Expected DL-AoD/ZoD and uncertainty (of the expected DL-AoD/ZoD value) range(s) can be provided to the UE for each [TRP].
    Option 2: Indication of expected DL-AoA/Zenith-of-Arrival (ZoA) value and uncertainty (of the expected DL-AoA/ZoA value) range(s) may be signaled by the LMF to the UE.
    Single Expected DL-AoA/ZoA and uncertainty (of the expected DL-AoA/ZoA value) range(s) can be provided to the UE for each [TRP].
    Option 3: Indication of expected AoD/ZoD or AoA/ZoA value and uncertainty may be not introduced.

Configured Grant UL Transmission

For Rel-16 NR positioning, the positioning measurement reporting from a UE to a Location Management Function (LMF) may be transparent to a serving base station, and may use a regular uplink access procedure in which a UE sends a Scheduling Request (SR) to access the channel. This may result in a significant delay.

Figure 1A:
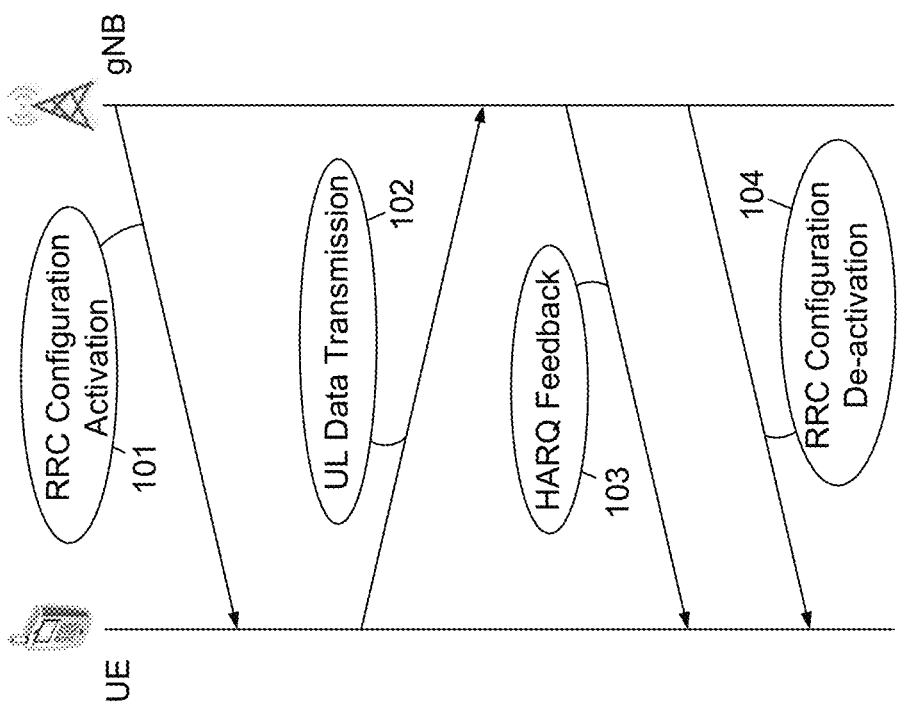
FIG. 1A depicts a signal flow for a Configured Grant Type 1 in which an uplink grant may be provided by Radio Resource Control (RRC) and stored as configured uplink grant.

FIG. 1A depicts a signal flow for a Configured Grant Type 1 in which an uplink grant may be provided by Radio Resource Control (RRC) and stored as configured uplink grant. At 101, a RRC is sent from a gNB to a UE. At 102, the UE sends a UL Data Transmission to the gNB. At 103, the gNB provides HARC feedback. At 104, the gNB sends a RRC configuration de-activation to the UE.

FIG. 1B depicts a signal flow for a Configured Grant Type 2 in which an uplink grant may be provided by Physical Downlink Control Channel (PDCCH), and stored or cleared as a configured uplink grant. At 111, a RRC is sent from a gNB to a UE. At 112, the gNB sends L1 signaling to the UE that indicates a configured uplink grant activation or deactivation. At 113, the UE sends a UL Data Transmission to the gNB. At 114, the gNB provides HARC feedback. At 115, the gNB sends L1 signaling de-activating to the UE.

No Scheduling Request (SR) may be sent for a Configured Grant (CG) before transmitting an uplink packet, which may tend to reduce overall latency. A configured grant may be configured with a ConfiguredGrantConfig element, as shown in the following example ConfiguredGrantConfig Information Element (IE).

| ConfiguredGrantConfig Information Element |
|---|

```
-- ASN1START
-- TAG-CONFIGUREDGRANTCONFIG-START
ConfiguredGrantConfig ::=               SEQUENCE {
    frequencyHopping                    ENUMERATED {intraSlot, interSlot}
OPTIONAL,   -- Need S
    cg-DMRS-Configuration               DMRS-UplinkConfig,
    mcs-Table                           ENUMERATED {qam256, qam64LowSE}
OPTIONAL,   -- Need S
    mcs-TableTransformPrecoder          ENUMERATED {qam256, qam64LowSE}
OPTIONAL,   -- Need S
    uci-OnPUSCH                         SetupRelease { CG-UCI-OnPUSCH }
OPTIONAL,   -- Need M
    resourceAllocation                  ENUMERATED { resourceAllocationType0,
resourceAllocationType1, dynamicSwitch },
    rbg-Size                            ENUMERATED {config2}
OPTIONAL,   -- Need S
    powerControlLoopToUse               ENUMERATED {n0, n1},
    p0-PUSCH-Alpha                      P0-PUSCH-AlphaSetId,
    transformPrecoder                   ENUMERATED {enabled, disabled}
OPTIONAL,   -- Need S
    nrofHARQ-Processes                  INTEGER(1..16),
    repK,                               ENUMERATED {n1, n2, n4, n8},
    repK-RV                             ENUMERATED {s1-0231, s2-0303, s3-0000}
OPTIONAL,   -- Need R
    periodicity                         ENUMERATED {
                                            sym2, sym7, sym1x14, sym2x14, sym4x14, sym5x14,
sym8x14, sym10x14, sym16x14, sym20x14,
                                            sym32x14, sym40x14, sym64x14, sym80x14,
sym128x14, sym160x14, sym256x14, sym320x14, sym512x14,
                                            sym640x14, sym1024x14, sym1280x14, sym2560x14,
sym5120x14,
                                            sym6, sym1x12, sym2x12, sym4x12, sym5x12,
sym8x12, sym10x12, sym16x12, sym20x12, sym32x12,
                                            sym40x12, sym64x12, sym80x12, sym128x12,
sym160x12, sym256x12, sym320x12, sym512x12, sym640x12,
                                            sym1280x12, sym2560x12
    },
    configuredGrantTimer                INTEGER (1..64)
OPTIONAL,   -- Need R
    rrc-ConfiguredUplinkGrant           SEQUENCE {
        timeDomainOffset                INTEGER (0..5119),
        timeDomainAllocation            INTEGER (0..15),
        frequencyDomainAllocation       BIT STRING (SIZE(18)),
        antennaPort                     INTEGER (0..31),
        dmrs-SeqInitialization          INTEGER (0..1)
OPTIONAL,   -- Need R
        precodingAndNumberOfLayers      INTEGER (0..63),
        srs-ResourceIndicator           INTEGER (0..15)
OPTIONAL,   -- Need R
        mcsAndTBS                       INTEGER (0..31),
        frequencyHoppingOffset          INTEGER (1..maxNrofPhysicalResourceBlocks-1)
OPTIONAL,   -- Need R
        pathlossReferenceIndex          INTEGER (0..maxNrofPUSCH-PathlossReferenceRSs-1),
        ...,
        [[
        pusch-RepTypeIndicator-r16      ENUMERATED {pusch-RepTypeA,pusch-RepTypeB}
OPTIONAL,   -- Need M
        frequencyHoppingPUSCH-RepTypeB-r16  ENUMERATED {interRepetition, interSlot}
OPTIONAL,   -- Cond RepTypeB
        timeReferenceSFN-r16            ENUMERATED {sfn512}
OPTIONAL    -- Need S
        ]]
    }
OPTIONAL,   -- Need R
    ...,
    [[
    cg-RetransmissionTimer-r16          INTEGER (1..64)
OPTIONAL,   -- Need R
    cg-minDFI-Delay-r16                 ENUMERATED
                                            {sym7, sym1x14, sym2x14, sym3x14, sym4x14,
sym5x14, sym6x14, sym7x14, sym8x14,
                                             sym9x14, sym10x14, sym11x14, sym12x14,
sym13x14, sym14x14,sym15x14, sym16x14
                                            }
OPTIONAL,   -- Need R
    cg-nrofPUSCH-InSlot-r16             INTEGER (1..7)
OPTIONAL,   -- Need R
    cg-nrofSlots-r16                    INTEGER (1..40)
```

| ConfiguredGrantConfig Information Element |
|---|
| ```
      OPTIONAL,    -- Need R
    cg-StartingOffsets-r16              CG-StartingOffsets-r16
      OPTIONAL,    -- Need R
    cg-UCI-Multiplexing-r16             ENUMERATED {enabled}
      OPTIONAL,    -- Need R
    cg-COT-SharingOffset-r16            INTEGER (1..39)
      OPTIONAL,    -- Need R
    betaOffsetCG-UCI-r16                INTEGER (0..31)
      OPTIONAL,    -- Need R
    cg-COT-SharingList-r16              SEQUENCE (SIZE (1..1709)) OF CG-COT-Sharing-r16
      OPTIONAL,    -- Need R
    harq-ProcID-Offset-r16              INTEGER (0..15)
      OPTIONAL,    -- Need M
    harq-ProcID-Offset2-r16             INTEGER (0..15)
      OPTIONAL,    -- Need M
    configuredGrantConfigIndex-r16      ConfiguredGrantConfigIndex-r16
      OPTIONAL,    -- Cond CG-List
    configuredGrantConfigIndexMAC-r16   ConfiguredGrantConfigIndexMAC-r16
      OPTIONAL,    -- Cond CG-IndexMAC
    periodicityExt-r16                  INTEGER (1..5120)
      OPTIONAL,    -- Need R
    startingFromRV0-r16                 ENUMERATED {on, off}
      OPTIONAL,    -- Need R
    phy-PriorityIndex-r16               ENUMERATED {p0, p1}
      OPTIONAL,    -- Need R
    autonomousTx-r16                    ENUMERATED {enabled}
      OPTIONAL     -- Cond LCH-BasedPrioritization
  ]]
}
CG-UCI-OnPUSCH ::= CHOICE {
    dynamic                             SEQUENCE (SIZE (1..4)) OF BetaOffsets,
    semiStatic                          BetaOffsets
}
CG-COT-Sharing-r16 ::= CHOICE {
    noCOT-Sharing-r16                   NULL,
    cot-Sharing-r16                     SEQUENCE {
      duration-r16                        INTEGER (1..39),
      Offset-r16                          INTEGER (1..39),
      channelAccessPriority-r16           INTEGER (1..4)
    }
}
CG-StartingOffsets-r16 ::= SEQUENCE {
    cg-StartingFullBW-InsideCOT-r16     SEQUENCE (SIZE (1..7)) OF INTEGER (0..6)
      OPTIONAL,  -- Need R
    cg-StartingFullBW-OutsideCOT-r16    SEQUENCE (SIZE (1..7)) OF INTEGER (0..6)
      OPTIONAL,  -- Need R
    cg-StartingPartialBW-InsideCOT-r16  INTEGER (0..6)
      OPTIONAL,  -- Need R
    cg-StartingPartialBW-OutsideCOT-r16 INTEGER (0..6)
      OPTIONAL   -- Need R
}
-- TAG-CONFIGUREDGRANTCONFIG-STOP
-- ASN1STOP
``` |

In some embodiments of Rel-16, an IE NR-DL-TDOA-ProvideCapabilities may be used by a UE (i.e., a target device) to indicate a capability of the UE to support NR DL-TDOA, and to provide the NR DL-TDOA positioning capabilities of the UE to a location server. An example IE NR-DL-TDOA-ProvideCapabilities is shown below.

```
-- ASN1START
NR-DL-TDOA-ProvideCapabilities-r16 ::= SEQUENCE {
    nr-DL-TDOA-Mode-r16                    PositioningModes,
    nr-DL-TDOA-PRS-Capability-r16          NR-DL-PRS-ResourcesCapability-r16,
    nr-DL-TDOA-MeasurementCapability-r16   NR-DL-TDOA-MeasurementCapability-r16,
    nr-DL-PRS-QCL-ProcessingCapability-r16 NR-DL-PRS-QCL-ProcessingCapability-r16,
    nr-DL-PRS-ProcessingCapability-r16     NR-DL-PRS-ProcessingCapability-r16,
    additionalPathsReport-r16              ENUMERATED { supported }       OPTIONAL,
    periodicalReporting-r16                PositioningModes               OPTIONAL,
    ...
}
-- ASN1STOP
```

For DL-TDOA, a UE may provide a Rx TEG associated with RSTD measurements to the LMF for timing error mitigation. In some embodiments of the Rel-16, an IE NR-DL-TDOA-SignalMeasurementInformation may be used by a UE to provide NR DL-TDOA measurements to a location server. An example IE NR-DL-TDOA-SignalMeasurementInformation is shown below. Similarly, a reported Rx TEG from a UE to the LMF may be included in an IE NR-DL-TDOA-SignalMeasurementInformation.

SRS Configuration

In some embodiments, an IE SRS-Config may be used to configure sounding reference signal transmissions. The configuration may define a list of SRS-Resources and a list of SRS-ResourceSets. Each resource set may define a set of SRS-Resources. The network may trigger transmission of the set of SRS-Resources using a configured aperiodicSRS-ResourceTrigger (L1 DCI). The IE SRS-Resources may define resources for Rel-16 positioning. An example IE SRS-Resources is shown below:

```
-- ASN1START
NR-DL-TDOA-SignalMeasurementInformation-r16 ::= SEQUENCE {
    dl-PRS-ReferenceInfo-r16        DL-PRS-ID-Info-r16,
    nr-DL-TDOA-MeasList-r16         NR-DL-TDOA-MeasList-r16,
    ...
}
NR-DL-TDOA-MeasList-r16 ::= SEQUENCE (SIZE(1..nrMaxTRPs-r16)) OF NR-DL-TDOA-MeasElement-r16
NR-DL-TDOA-MeasElement-r16 ::= SEQUENCE {
    dl-PRS-ID-r16                   INTEGER (0..255),
    nr-PhysCellID-r16               NR-PhysCellID-r16                    OPTIONAL,
    nr-CellGlobalID-r16             NCGI-r15                             OPTIONAL,
    nr-ARFCN-r16                    ARFCN-ValueNR-r15                    OPTIONAL,
    nr-DL-PRS-ResourceID-r16        NR-DL-PRS-ResourceID-r16             OPTIONAL,
    nr-DL-PRS-ResourceSetID-r16     NR-DL-PRS-ResourceSetID-r16          OPTIONAL,
    nr-TimeStamp-r16                NR-TimeStamp-r16,
    nr-RSTD-r16                     CHOICE {
        k0-r16                          INTEGER (0..1970049),
        k1-r16                          INTEGER (0..985025),
        k2-r16                          INTEGER (0..492513),
        k3-r16                          INTEGER (0..246257),
        k4-r16                          INTEGER (0..123129),
        k5-r16                          INTEGER (0..61565),
        ...
    },
    nr-AdditionalPathList-r16       NR-AdditionalPathList-r16            OPTIONAL,
    nr-TimingQuality-r16            NR-TimingQuality-r16,
    nr-DL-PRS-RSRP-Result-r16       INTEGER (0..126)                     OPTIONAL,
    nr-DL-TDOA-AdditionalMeasurements-r16
                                    NR-DL-TDOA-AdditionalMeasurements-r16    OPTIONAL,
    ...
}
NR-DL-TDOA-AdditionalMeasurements-r16 ::= SEQUENCE (SIZE (1..3)) OF
                                    NR-DL-TDOA-AdditionalMeasurementElement-r16
NR-DL-TDOA-AdditionalMeasurementElement-r16 ::= SEQUENCE {
    nr-DL-PRS-ResourceID-r16        NR-DL-PRS-ResourceID-r16             OPTIONAL,
    nr-DL-PRS-ResourceSetID-r16     NR-DL-PRS-ResourceSetID-r16          OPTIONAL,
    nr-TimeStamp-r16                NR-TimeStamp-r16,
    nr-RSTD-ResultDiff-r16          CHOICE {
        k0-r16                          INTEGER (0..8191),
        k1-r16                          INTEGER (0..4095),
        k2-r16                          INTEGER (0..2047),
        k3-r16                          INTEGER (0..1023),
        k4-r16                          INTEGER (0..511),
        k5-r16                          INTEGER (0..255),
        ...
    },
    nr-TimingQuality-r16            NR-TimingQuality-r16,
    nr-DL-PRS-RSRP-ResultDiff-r16   INTEGER (0..61)                      OPTIONAL,
    nr-AdditionalPathList-r16       NR-AdditionalPathList-r16            OPTIONAL,
    ...
}
-- ASN1STOP
```

| SRS-PosResource |
| --- |

```
SRS-PosResource-r16::=            SEQUENCE {
  srs-PosResourceId-r16             SRS-PosResourceId-r16,
  transmissionComb-r16              CHOICE {
    n2-r16                            SEQUENCE {
      combOffset-n2-r16                 INTEGER (0..1),
      cyclicShift-n2-r16                INTEGER (0..7)
    },
    n4-r16                            SEQUENCE {
      combOffset-n4-16                  INTEGER (0..3),
      cyclicShift-n4-r16                INTEGER (0..11)
    },
    n8-r16                            SEQUENCE {
      combOffset-n8-r16                 INTEGER (0..7),
      cyclicShift-n8-r16                INTEGER (0..5)
    },
    ...
  },
  resourceMapping-r16               SEQUENCE {
    startPosition-r16                 INTEGER (0..13),
    nrofSymbols-r16                   ENUMERATED {n1, n2, n4, n8, n12}
  },
  freqDomainShift-r16               INTEGER (0..268),
  freqHopping-r16                   SEQUENCE {
    c-SRS-r16                         INTEGER (0..63),
    ...
  },
  groupOrSequenceHopping-r16        ENUMERATED { neither, groupHopping, sequenceHopping
},
  resourceType-r16                  CHOICE {
    aperiodic-r16                     SEQUENCE {
      slotOffset-r16                    INTEGER (1..32)
OPTIONAL,   -- Need S
      ...
    },
    semi-persistent-r16               SEQUENCE {
      periodicityAndOffset-sp-r16       SRS-PeriodicityAndOffset-r16,
      ...
    },
    periodic-r16                      SEQUENCE {
      periodicityAndOffset-p-r16        SRS-PeriodicityAndOffset-r16,
      ...
    }
  },
  sequenceId-r16                    INTEGER (0..65535),
  spatialRelationInfoPos-r16        SRS-SpatialRelationInfoPos-r16
OPTIONAL,   -- Need R
  ...
}
SRS-SpatialRelationInfoPos-r16 ::= CHOICE {
  servingRS-r16                     SEQUENCE {
    servingCellId                     ServCellIndex
OPTIONAL,   -- Need S
    referenceSignal-r16               CHOICE {
      ssb-IndexServing-r16              SSB-Index,
      csi-RS-IndexServing-r16           NZP-CSI-RS-ResourceId,
      srs-SpatialRelation-r16           SEQUENCE {
        resourceSelection-r16             CHOICE {
          srs-ResourceId-r16                SRS-ResourceId,
          srs-PosResourceId-r16             SRS-PosResourceId-r16
        },
        uplinkBWP-r16                     BWP-Id
      }
    }
  },
  ssb-Ncell-r16                     SSB-InfoNcell-r16,
  dl-PRS-r16                        DL-PRS-Info-r16
}
```

| SRS-Resource field descriptions |
| --- | cyclicShift-n2
Cyclic shift configuration (see TS 38.214 [19], clause 6.2.1).
cyclicShift-n4
Cyclic shift configuration (see TS 38.214 [19], clause 6.2.1).
freqHopping

| SRS-Resource field descriptions |
| --- |
| Includes parameters capturing SRS frequency hopping (see TS 38.214 [19], clause 6.2.1). For CLI SRS-RSRP measurement, the network always configures this field such that b-hop > b-SRS.<br>groupOrSequenceHopping<br>Parameters(s) for configuring group or sequence hopping (see TS 38.211 [16], clause 6.4.1.4.2). For CLI SRS-RSRP measurement, the network always configures this parameter to 'neither'.<br>nrofSRS-Ports<br>Number of ports. For CLI SRS-RSRP measurement, the network always configures this parameter to 'port1'.<br>periodicityAndOffset-p<br>Periodicity and slot offset for this SRS resource. All values are in "number of slots". Value sl1 corresponds to a periodicity of 1 slot, value sl2 corresponds to a periodicity of 2 slots, and so on. For each periodicity the corresponding offset is givers in number of slots. For periodicity sl1 the offset is 0 slots (see TS 38.214 [19], clause 6.2.1). For CLI SRS-RSRP measurement, sl1280 and sl2560 cannot be configured.<br>periodicityAndOffset-sp<br>Periodicity and slot offset for this SRS resource. All values are in "number of slots". Value sl1 corresponds to a periodicity of 1 slot, value sl2 corresponds to a periodicity of 2 slots, and so on. For each periodicity the corresponding offset is given in number of slots. For periodicity sl1 the offset is 0 slots (see TS 38.214 [19], clause 6.2.1).<br>ptrs-PortIndex<br>The PTRS port index for this SRS resource for non-codebook based UL MIMO. This is only applicable when the corresponding PTRS-UplinkConfig is set to CP-OFDM. The ptrs-PortIndex configured here must be smaller than the maxNrofPorts configured in the PTRS-UplinkConfig (see TS 38.214 [19], clause 6.2.3.1). This parameter is not applicable to CLI SRS-RSRP measurement.<br>resourceMapping<br>OFDM symbol location of the SRS resource within a slot including nrofSymbols (number of OFDM symbols), startPosition (value 0 refers to the last symbol, value 1 refers to the second last symbol, and so on) and repetitionFactor (see TS 38.214 [19], clause 6.2.1 and TS 38.211 [16], clause 6.4.1.4). The configured SRS resource does not exceed the slot boundary. If resourceMapping-r16 is signalled, UE shall ignore the resourceMapping (without suffix). For CLI SRS-RSRP measurement, the network always configures nrofSymbols and repetitionFactor to 'n1'.<br>resourceType<br>Periodicity and offset for semi-persistent and periodic SRS resource (see TS 38.214 [19], clause 6.2.1) For CLI SRS-RSRP measurement, only 'periodic' is applicable for resourceType<br>sequenceId<br>Sequence ID used to initialize pseudo random group and sequence hopping (see TS 38.214 [19], clause 6.2.1).<br>servingCellId<br>The serving Cell ID of the source SSB, CSI-RS, or SRS for the spatial relation of the target SRS resource. If this field is absent the SSB, the CSI-RS, or the SRS is from the same serving cell where the SRS is configured.<br>spatialRelationInfo<br>Configuration of the spatial relation between a reference RS and the target SRS. Reference RS can be SSB/CSI-RS/SRS (see TS 38.214 [19], clause 6.2.1). This parameter is not applicable to CLI SRS-RSRP measurement.<br>spatialRelationInfoPos<br>Configuration of the spatial relation between a reference RS and the target SRS. Reference RS can be SSB/CSI-RS/SRS/DL-PRS (see TS 38.214 [19], clause 6.2.1).<br>srs-RequestDCI-0-2<br>Indicate the number of bits for "SRS request" in DCI format 0_2. When the field is absent, then the value of 0 bit for "SRS request" in DCI format 0_2 is applied if the parameter srs-RequestDCI-0-2 is configured to value 1, 1 bit is used to indicate one of the first two rows of Table 7.3.1.1.2-24 in TS 38.212 [17] for triggered aperiodic SRS resource set. If the value 2 is configured, 2 bits are used to indicate one of the rows of Table 7.3.1.1.2-24 in TS 38.212 [17]. When UE is configured with supplementaryUplink, an extra bit (the first bit of the SRS request field) is used for the non-SUL/SUL indication.<br>srs-RequestDCI-1-2<br>Indicate the number of bits for "SRS request" in DCI format 1_2. When the field is absent, then the value of 0 bit for "SRS request" in DCI format 1_2 is applied. When the UE is configured with supplementaryUplink, an extra bit (the first bit of the SRS request field) is used for the non-SUL/SUL indication (see TS 38.214 [19], clause 6.1.1.2).<br>srs-ResourceSetAddModListDCI-0-2<br>List of SRS resource set to be added or modified for DCI format 0_2 (see TS 38.212 [17], clause 7.3.1).<br>srs-ResourcesSetToReleaseListDCI-0-2<br>List of SRS resource set to be released for DCI format 0_2 (see TS 38.212 [17], clause 7.3.1).<br>transmissionComb<br>Comb value (2 or 4 or 8) and comb offset (0..combValue−1) (see TS 38.214 [19], clause 6.2.1). |

LPP and NRPPa Message

The ProvideAssistanceData message body in a Long Term Evolution (LTE) Positioning Protocol (LPP) message may be used by a location server to provide assistance data to the target device either in response to a request from the target device or in an unsolicited manner. An example ProvideAssistanceData is shown below.

```
-- ASN1START
ProvideAssistanceData ::= SEQUENCE {
    criticalExtensions   CHOICE {
        c1                   CHOICE {
            provideAssistanceData-r9    ProvideAssistanceData-r9-IEs,
            spare3 NULL, spare2 NULL, spare1 NULL
        },
        criticalExtensionsFuture   SEQUENCE { }
```

-continued

```
    }
}
ProvideAssistanceData-r9-IEs ::= SEQUENCE {
    commonIEsProvideAssistanceData   CommonIEsProvideAssistanceData    OPTIONAL,    -- Need ON
    a-gnss-ProvideAssistanceData     A-GNSS-ProvideAssistanceData      OPTIONAL,    -- Need ON
    otdoa-ProvideAssistanceData      OTDOA-ProvideAssistanceData       OPTIONAL,    -- Need ON
    epdu-Provide-Assistance-Data     EPDU-Sequence                     OPTIONAL,    -- Need ON
    ...,
    [[
    sensor-ProvideAssistanceData-r14    Sensor-ProvideAssistanceData-r14    OPTIONAL,    -- Need ON
    tbs-ProvideAssistanceData-r14       TBS-ProvideAssistanceData-r14       OPTIONAL,    -- Need ON
    wlan-ProvideAssistanceData-r14      WLAN-ProvideAssistanceData-r14      OPTIONAL     -- Need ON
    ]],
    [[ nr-Multi-RTT-ProvideAssistanceData-r16
                                NR-Multi-RTT-ProvideAssistanceData-r16
                                                                        OPTIONAL,    -- Need ON
       nr-DL-AoD-ProvideAssistanceData-r16
                                NR-DL-AoD-ProvideAssistanceData-r16    OPTIONAL,    -- Need ON
       nr-DL-TDOA-ProvideAssistanceData-r16
                                NR-DL-TDOA-ProvideAssistanceData-r16
                                                                        OPTIONAL     -- Need ON
    ]]
}
-- ASN1STOP
```

The ProvideLocationInformation message body in a LPP message may be used by a UE to provide positioning measurements or position estimates to a location server. An example ProvideLocationInformation message body in a LPP message is shown below.

```
-- ASN1START
ProvideLocationInformation ::= SEQUENCE {
    criticalExtensions   CHOICE {
            c1          CHOICE {
                provideLocationInformation-r9   ProvideLocationInformation-r9-IEs,
                spare3 NULL, spare2 NULL, spare1 NULL
            },
            criticalExtensionsFuture    SEQUENCE { }
    }
}
ProvideLocationInformation-r9-IEs ::= SEQUENCE {
    commonIEsProvideLocationInformation
                                        CommonIEsProvideLocationInformation    OPTIONAL,
    a-gnss-ProvideLocationInformation   A-GNSS-ProvideLocationInformation      OPTIONAL,
    otdoa-ProvideLocationInformation    OTDOA-ProvideLocationInformation       OPTIONAL,
    ecid-ProvideLocationInformation     ECID-ProvideLocationInformation        OPTIONAL,
    epdu-ProvideLocationInformation     EPDU-Sequence                          OPTIONAL,
    ...,
    [[
    sensor-ProvideLocationInformation-r13
                                        Sensor-ProvideLocationInformation-r13
                                                                               OPTIONAL,
    tbs-ProvideLocationInformation-r13  TBS-ProvideLocationInformation-r13     OPTIONAL,
    wlan-ProvideLocationInformation-r13 WLAN-ProvideLocationInformation-r13    OPTIONAL,
    bt-ProvideLocationInformation-r13   BT-ProvideLocationInformation-r13      OPTIONAL
    ]],
    [[    nr-ECID-ProvideLocationInformation-r16
                                        NR-ECID-ProvideLocationInformation-r16     OPTIONAL,
        nr-Multi-RTT-ProvideLocationInformation-r16
                                        NR-Multi-RTT-ProvideLocationInformation-r16   OPTIONAL,
        nr-DL-AoD-ProvideLocationInformation-r16
                                        NR-DL-AoD-ProvideLocationInformation-r16   OPTIONAL,
```

```
    nr-DL-TDOA-ProvideLocationInformation-r16
                            NR-DL-TDOA-ProvideLocationInformation-r16    OPTIONAL
  ]]
}
-- ASN1STOP
```

A Measurement Report message may be sent by a Next Generation Radio Access Network (NG-RAN) node to report positioning measurements for a target UE. A description of different example fields of a Measurement Report message sent by a NG-RAN node is shown below.

| | | Direction: NG-RAN node → LMF | | | |
|---|---|---|---|---|---|
| IE/Group Name | Presence Range | IE type and reference | Semantics description | Criticality | Assigned Criticality |
| Message Type | M | 9.2.3 | | YES | reject |
| NRPPa Transaction ID | M | 9.2.4 | | — | |
| LMF Measurement ID | M | INTEGER (1..65536, ...) | | YES | reject |
| RAN Measurement ID | M | INTEGER (1..65536, ...) | | YES | reject |
| TRP Measurement Response List | 1 | | | YES | reject |
| >TRP Measurement Response Item | 1..<maxnoofMeasTRPs> | | | EACH | reject |
| >>TRP ID | M | 9.2.24 | | — | |
| >> TRP Measurement Result | M | 9.2.37 | | — | |
| >>Cell ID | O | NR CGI 9.2.9 | The Cell ID of the TRP identified by the TRP ID IE. | YES | ignore |

The IE TRP Measurement Result may contain the measurement result. A description of example fields of an IE TRP Measurement Result are shown below.

| IE/Group Name | Presence | Range | IE Type and Reference | Semantics Description |
|---|---|---|---|---|
| Measured Result Item | | 1..<maxnoPosMeas> | | |
| >CHOICE Measured Results Value | M | | | |
| >>UL Angle of Arrival | M | | 9.2.38 | |
| >>UL SRS-RSRP | M | | INTEGER (0..126) | |
| >>UL RTOA | M | | 9.2.39 | |
| >>gNB Rx-Tx Time Difference | M | | 9.2.40 | |
| >Time Stamp | M | | 9.2.42 | |
| >Measurement Quality | O | | 9.2.43 | |
| >Measurement Beam Information | O | | 9.2.57 | |

Accuracy Improvements Through Rx/Tx Timing Error Mitigation

The subject matter disclosed herein provides a signaling configuration for a UL implementing a measurement reporting to provide an accuracy improvement for timing-based and angle-based positioning.

Signaling Design for Rx/Tx TEG

UL Tx TEG for UL-TDOA

For uplink techniques (e.g., UL-TDOA), a UE may indicate a TEG associated with an SRS signal. In one embodiment, a UE may report a capability to provide a TEG with the SRS in an existing NR-UL-ProvideCapabilities by adding a reportTEG field. Subsequently, the UE may provide the TEG with the actual measurement.

Figure 2:
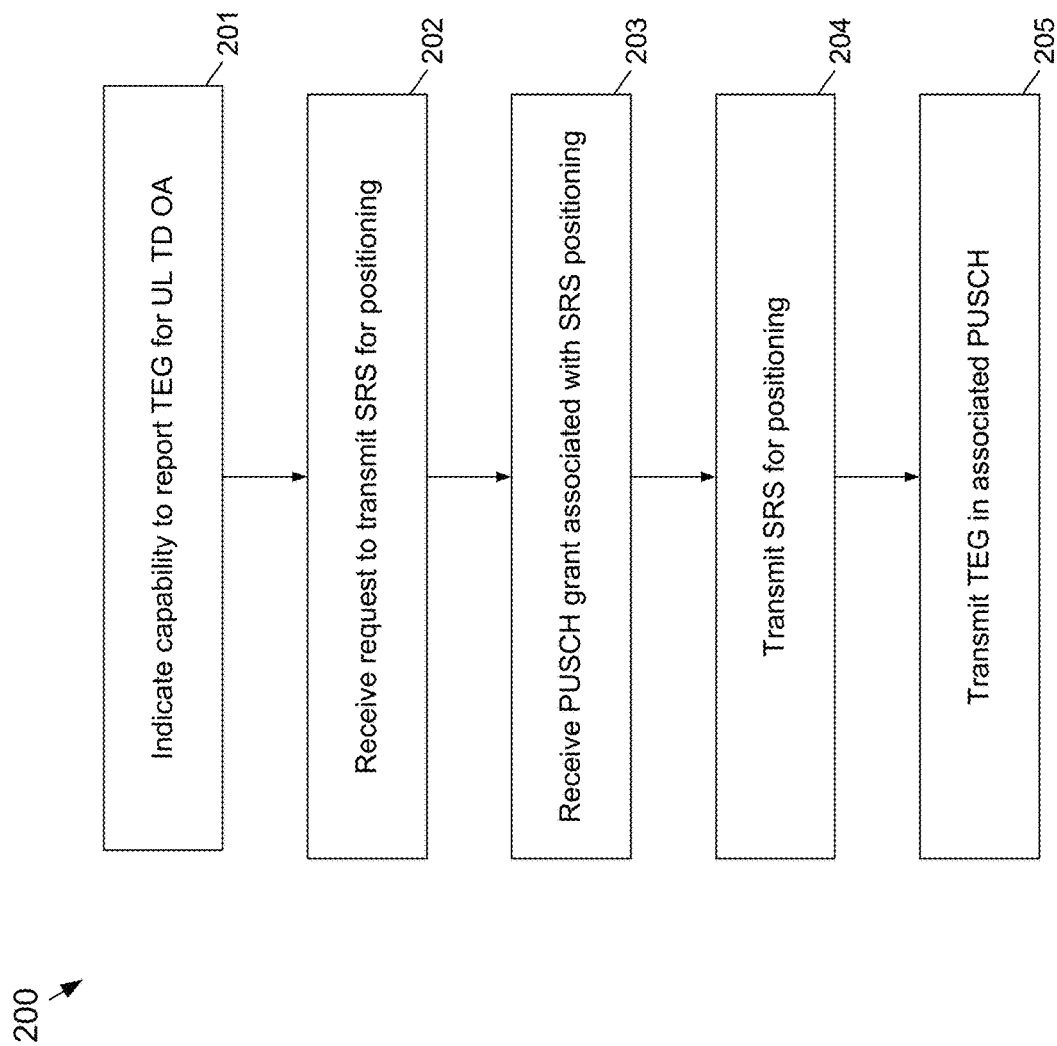
FIG. 2 is a flowchart showing an example embodiment of a method providing an association between an SRS and a PUSCH for TEG transmission according to the subject matter disclosed herein.

FIG. 2 is a flowchart showing an example embodiment of a method 200 providing an association between an SRS and a PUSCH for TEG transmission according to the subject matter disclosed herein. At 201, a UE sends a NR-UL-ProvideCapabilities to a gNB indicating that the UE is capable to report a TEG for UL TDOA. At 202, the UE receives a request from the gNB to transmit an SRS for positioning. The SRS configuration may be the same configuration as for some embodiments of the Rel-16. The SRS may be periodic or aperiodic, and triggered by RRC signaling or dynamic DCI signaling. For a fully static mapping, a SRS configuration for NR may be provided in a SRS-PosResource RRC message (see SRS Configuration above). This message contains the srs-PosResourceId IE. A UE may send an RRC message uniquely connecting the srs-PosResourceId to a given TEG. For dynamic mapping, whenever a UE transmits the SRS, the UE may indicate which TEG to use.

At 203, the UE receives a PUSCH grant from the gNB that is associated with SRS positioning. A UE may indicate the TEG associated with the SRS positioning. In one embodiment, a UE may transmit the TEG in a Physical Uplink Shared Channel (PUSCH) in the same subframe as the SRS for positioning. If the SRS transmission is triggered by higher layers, the association of the TEG to the SRS positioning is whether a UE receives a PUSCH grant in the same slot as the UE has for transmitting an SRS for positioning, in which case the UE transmits the TEG in the PUSCH grant. Note that the PUSCH may transmit the TEG in either an RRC message or a MAC CE message. Also, the SRS and PUSCH transmission do not necessarily have to be in the same subframe. The PUSCH may be transmitted using a fixed offset (in terms of slots) both known by the UE and the gNB. This way, there may be an implicit link between the TEG and the SRS for positioning. Alternatively, an explicit link may be used, but may involve additional signaling (e.g., new fields in the DCI).

At 204, the UE transmits SRS for positioning in a manner similar to that used for Rel-16. At 205, the UE may report a TEG on the PUSCH resources associated with the SRS. The PUSCH may not only carry the TEG, but using the shared nature of the channel, may also contain additional control, data, etc. The Tx TEGs information may then be forwarded to the LMF.

In some embodiments of Rel-16 positioning, the IE NR-UL-ProvideCapabilities may be used by a UE to indicate the capability of the UE to support UL-PRS and to provide UL-PRS capabilities of the target device to the location server. An example IE NR-UL-ProvideCapabilities that may be defined in some embodiments is shown below:

```
-- ASN1START
NR-UL-ProvideCapabilities-r16 ::= SEQUENCE {
    nr-UL-SRS-Capability-r16    NR-UL-SRS-Capability-r16,
    ...
}
-- ASN1STOP
```

New signaling may be used for a UE reporting the association information of UL SRS resources with Tx TEG in UL-TDOA. The UE may send a message (e.g., RRC) in which the UE may indicate to which SRS the TEG is linked with (e.g., by signaling the subframe/slot in the RRC message). This reporting may be done in a simpler manner by having a UL SRS for positioning and the associated reported TEG sent in the same slot. This way, the association may be implicit, may require less standards effort to define new messages, and may reduce overhead.

UE RxTx TEG for Multi-RTT

For multi-cell Round Trip Time (multi-RTT), information about the TEG for both the uplink and the downlink may be involved. The NR-Multi-RTT-SignalMeasurementInformation IE may be used towards such a purpose. Additionally, the capability to provide TEG should be included. For a UE Rx-Tx time difference measurement, it may be crucial for the LMF to know the sum of UE Rx and Tx timing error levels.

The IE NR-Multi-RTT-SignalMeasurementInformation may be used by the target device to provide NR Multi-RTT measurements to the location server. The measurements may be provided as a list of TRPs in which the first TRP in the list may be used as reference TRP. An example IE NR-Multi-RTT-SignalMeasurementInformation is shown below:

```
-- ASN1START
NR-Multi-RTT-SignalMeasurementInformation-r16 ::= SEQUENCE {
    nr-Multi-RTT-MeasList-r16           NR-Multi-RTT-MeasList-r16,
    nr-NTA-Offset-r16                   ENUMERATED { nTA1, nTA2, nTA3, nTA4, ... }    OPTIONAL,
    ...
}
NR-Multi-RTT-MeasList-r16 ::= SEQUENCE (SIZE(1..nrMaxTRPs-r16)) OF NR-Multi-RTT-MeasElement-r16
NR-Multi-RTT-MeasElement-r16 ::= SEQUENCE {
    dl-PRS-ID-r16                       INTEGER (0..255),
    nr-PhysCellID-r16                   NR-PhysCellID-r16                             OPTIONAL,
    nr-CellGlobalID-r16                 NCGI-r15                                      OPTIONAL,
    nr-ARFCN-r16                        ARFCN-ValueNR-r15                             OPTIONAL,
    nr-DL-PRS-ResourceID-r16            NR-DL-PRS-ResourceID-r16                      OPTIONAL,
    nr-DL-PRS-ResourceSetID-r16         NR-DL-PRS-ResourceSetID-r16                   OPTIONAL,
    nr-UE-RxTxTimeDiff-r16              CHOICE {
        k0-r16                              INTEGER (0..1970049),
        k1-r16                              INTEGER (0..985025),
        k2-r16                              INTEGER (0..492513),
        k3-r16                              INTEGER (0..246257),
        k4-r16                              INTEGER (0..123129),
        k5-r16                              INTEGER (0..61565),
        ...
    },
    nr-AdditionalPathList-r16           NR-AdditionalPathList-r16                     OPTIONAL,
    nr-TimeStamp-r16                    NR-TimeStamp-r16,
    nr-TimingQuality-r16                NR-TimingQuality-r16,
    nr-DL-PRS-RSRP-Result-r16           INTEGER (0..126)                              OPTIONAL,
    nr-Multi-RTT-AdditionalMeasurements-r16
                                        NR-Multi-RTT-AdditionalMeasurements-r16       OPTIONAL,
    ...
}
NR-Multi-RTT-AdditionalMeasurements-r16 ::= SEQUENCE (SIZE (1..3)) OF
                                        NR-Multi-RTT-AdditionalMeasurementElement-r16
NR-Multi-RTT-AdditionalMeasurementElement-r16 ::= SEQUENCE {
    nr-DL-PRS-ResourceID-r16            NR-DL-PRS-ResourceID-r16                      OPTIONAL,
    nr-DL-PRS-ResourceSetID-r16         NR-DL-PRS-ResourceSetID-r16                   OPTIONAL,
    nr-DL-PRS-RSRP-ResultDiff-r16       INTEGER (0..61)                               OPTIONAL,
    nr-UE-RxTxTimeDiffAdditional-r16    CHOICE {
        k0-r16                              INTEGER (0..8191),
        k1-r16                              INTEGER (0..4095),
        k2-r16                              INTEGER (0..2047),
```

```
    k3-r16                      INTEGER (0..023),
    k4-r16                      INTEGER (0..511),
    k5-r16                      INTEGER (0..255),
    ...
  },
  nr-TimingQuality-r16          NR-TimingQuality-r16,
  nr-AdditionalPathList-r16     NR-AdditionalPathList-r16          OPTIONAL,
  nr-TimeStamp-r16              NR-TimeStamp-r16,
  ...
}
-- ASN1STOP
```

UE Reporting for NLOS Mitigation

There may be a degradation in localization accuracy when Non-Line-Of-Sight (NLOS) links may be present during a localization estimation process. For an industrial factory-dense high (InF-DH) scenario, a sub-meter level requirement for horizontal positioning accuracy may not be achievable in both frequency range 1 (FR1) and frequency range 2 (FR2) bands due to the presence of NLOS paths. When compared with a case for Line-Of-Sight (LOS) path only, a received signal corresponding to the NLOS path has a delay offset, which may be due to additional reflections and scattering, and a different angle of arrival or departure. Identification and elimination of NLOS paths may be therefore beneficial for both time-based and angular-based positioning techniques.

In one embodiment, a method for NLOS mitigation in positioning may be to have a UE/TRP report whether measurements are based on LOS/NLOS conditions. The LMF may then consider this information when performing positioning. This may be done by having an LOS/NLOS indicator reported with the measurements.

In one embodiment, a reported LOS/NLOS indicator may be either a hard decision (binary values) or a soft decision (real values, such as a probability of the path being NLOS or LOS). A hard-decision indicator relies on the performance of UE/TRP LOS/NLOS detection, and may involve less complexity at the LMF. The soft decision may, however, provide higher accuracy for positioning performance.

Figure 3:
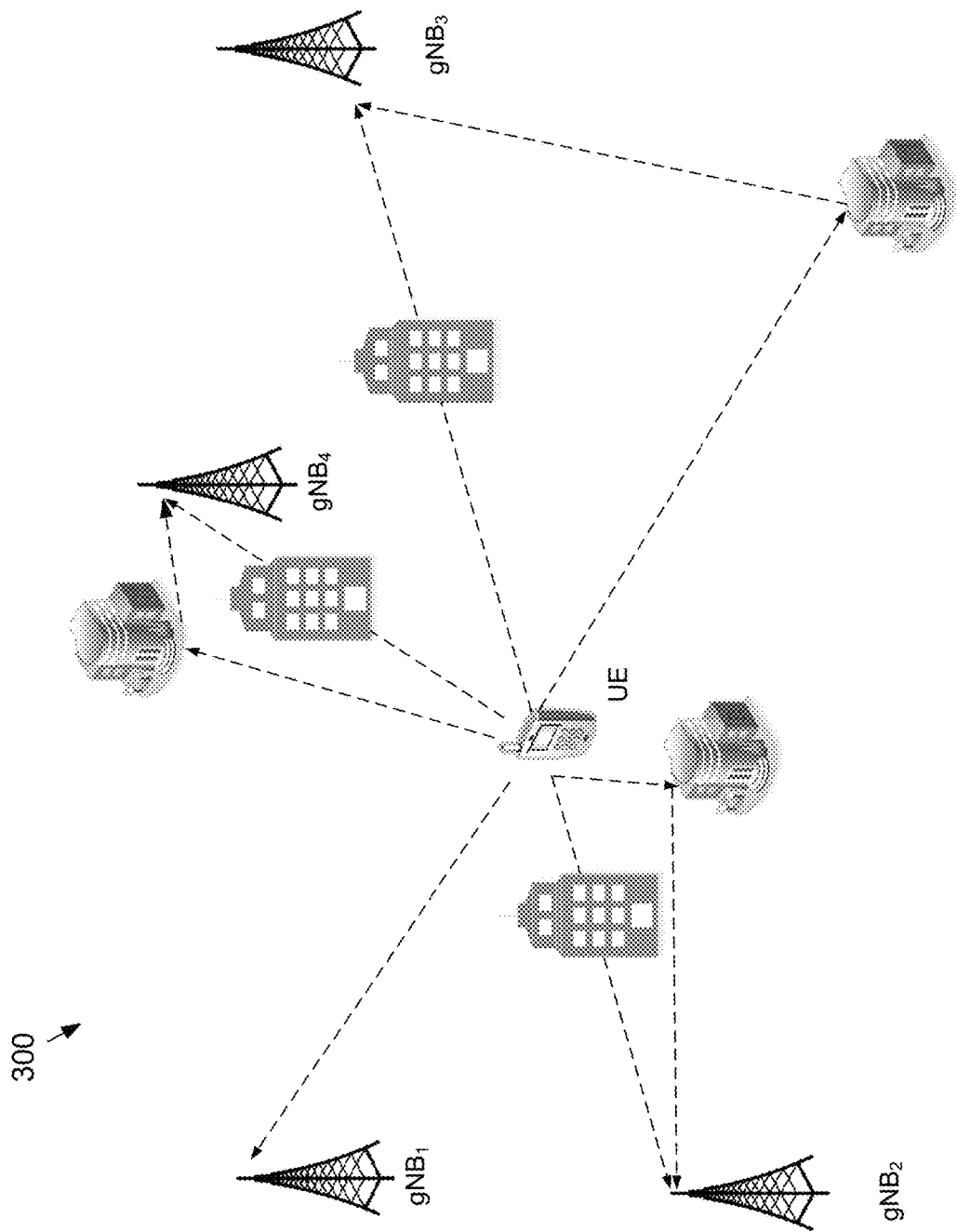
FIG. 3 depicts a wireless network configuration that includes multiple gNBs, multiple reflectors, and a UE.

For example, consider the DL-TDOA positioning as shown in FIG. 3, which depicts a wireless network configuration 300 that includes multiple gNBs, multiple reflectors (depicted as buildings), and a UE. A wireless path between the UE and $gNB_1$ is a LOS path. All other paths from the UE to $gNB_2$-$gNB_4$ are NLOS paths.

If a hard-decision indication is reported, the indication does not take into account the likelihood of a NLOS detection. As shown in FIG. 3, some TRP-UE paths may be almost LOS (i.e., a reflector close to the UE or TRP), whereas others may be very NLOS (i.e., a reflector far from the UE/TRP). Thus, not all NLOS conditions are equal, and the LMF may have an advantage in selecting reported measurements that correspond to better channel conditions. Thus, if a soft-decision indication is reported, the reported RSTD measurements may be sorted according to a particular metric at the location server. The location server may select some of the reported measurements, which may be more likely to be LOS paths, or assign different weights to all the measurements according to the associated NLOS conditions for location calculation. Furthermore, the soft-value LOS/NLOS indicators may be input into optimization algorithms to improve the overall position accuracy.

In some embodiments, the configuration for a NLOS/LOS indicator to be either hard or soft may be done by the LMF. The configuration may be sent in an RRC message, such as IE ProvideAssistanceData. And the NLOS/LOS indicator may be reported in a RRC message by a UE in IE ProvideLocationInformation and/or by a TRP in IE TRP Measurement Result in MEASUREMENT REPORT message. A description of the different example fields of a TRP Measurement Result is set forth above.

In some embodiments, a UE may be configured with a measurement window in the time domain by the higher-layer parameter nr-DL-PRS-ExpectedRSTD for positioning measurements (RSTD, Rx-Tx time difference, Reference Signal Received Power (RSRP)). A similar procedure may be used for NLOS mitigation for positioning. Specifically, in one embodiment a UE may be configured by the LMF with a timing window per TRP for searching the DL-PRS signal corresponding to a first arrival LOS path. The measurement window may correspond to an uncertainty range for a first-arriving signal along a LOS path. The configuration of the search window may involve a priori rough knowledge of the UE location at the LMF. This may be similar to the configuration of nr-DL-PRS-ExpectedRSTD. In another embodiment, a timing window may be configured for both and the UE and TRP by the LMF for positioning measurements (UL RTOA, Rx-Tx time difference), and for both timing-based and angle-based positioning methods. Given a timing window, a UE/TRP may make measurements for positioning based on paths that arrive within the window.

In some embodiments, subject to capabilities of a UE, a UE may be configured to measure and report the timing and the quality metrics for up to two additional detected paths that may be associated with each RSTD or UE Rx-Tx time difference. Additional path reporting may be beneficial for NLOS mitigation for both angle based and timing based positioning methods. In particular, when pattern-matching approaches may be used for DL-AoD, the information for additional paths may improve the positioning accuracy by providing a higher dimension of UE RSRP measurement vectors.

Two-Stage Beam Sweeping for DL-AoD

Another way of reducing latency and improving accuracy in DL-AoD may be to use a two-stage beamforming for RSRP measurement. In the current specifications, there is support for up to 2 DL PRS resource sets per TRP. In some ways this may already enable two-stage beam-sweeping by allowing for one DL PRS resource set to be for a narrow beam and one DL PRS resource set to be for a wide beam. What is lacking in the current specification, however, is some association information between the DL PRS resources within the two sets (e.g., DL PRS resource X and Y from set 2 are nested in DL PRS resource Z from set 1). The association information may be only known at the LMF. Thus, one solution may be that the LMF may request a UE to make measurement on a specific list of PRS resources, which respectively corresponds to wide beams and narrow beams for the same TRP. Given the fact that the PRS resources belonging to the same PRS resource set have the same time-frequency domain configuration, it may be desirable to configure wide beams for one PRS resource set and narrow beams for another different PRS resource set when TRP performs beam sweeping. Once a UE reports the RSRP measurements, the LMF may determine the correlation between different PRS resources and improve the AOD measurement accuracy.

Another way of implementing two-stage beamforming may be to introduce a new Quasi-Colocation (QCL) relationship between the PRS resources in two different PRS resource sets. The following agreements have been approved in 3GPP meeting RAN1 #99, which are related to the QCL relationship between PRS.

> For positioning purposes, to assist UE to perform Rx beamforming, the following can be used (option 1 from previous related agreement in RAN1#97):
> The DL PRS can be configured to be QCL Type D with a DL Reference Signal from a serving or neighbouring cell. SSB or DL-PRS can be the QCL Type D source of DL-PRS.
> FFS: CSI-RS for RRM
> If the DL-PRS-QCL-Info for a DL-PRS Resource of a TRP indicates 'QCL Type-D from a DL-PRS Resource', the DL-PRS-ResourceSetId and the DL-PRS-ResourceId for the indicated source DL-PRS Resource can be provided.
> QCL relation between two DL-PRS Resources can only be provided for DL-PRS Resources of the same TRP.

Based on the Rel-16 positioning mechanism, some embodiments disclosed herein may include a new signaling that enables the LMF to inform a UE that the two-stage beamforming is applied. When two-stage beamforming is used, if a UE measures one DL PRS resource that is the QCL source for other PRS resources, then the UE also should measure all the other PRS resources that are QCLed with this PRS resource. Specifically, some embodiments may include an IE TwoStageBeamforming in the PRS configuration IE NR-DL-PRS-Info as below. This newly introduced IE may be used to indicate the new QCL relationship between PRS resources from the same TRP. The new QCL relationship may be defined as the QCL resources corresponding to a wide Tx beam and the PRS resources QCLed with resources correspond to the a narrow Tx beam. If the IE TwoStageBeamforming is set to be FALSE or missing, it means that two-stage beamforming may not be performed, and a legacy QCL relationship is applied to PRS resources.

```
-- ASN1START
NR-DL-PRS-Info-r16 ::= SEQUENCE {
   nr-DL-PRS-ResourceSetList-r16      SEQUENCE (SIZE (1..nrMaxSetsPerTrp-r16)) OF
                                                   NR-DL-PRS-ResourceSet-r16,
   ...
}
NR-DL-PRS-ResourceSet-r16 ::= SEQUENCE {
   nr-DL-PRS-ResourceSetID-r16        NR-DL-PRS-ResourceSetID-r16,
   dl-PRS-Periodicity-and-ResourceSetSlotOffset-r16
                                      NR-DL-PRS-Periodicity-and-ResourceSetSlotOffset-r16,
   dl-PRS-ResourceRepetitionFactor-r16 ENUMERATED {n2, n4, n6, n8, n16, n32, ...}
                                                   OPTIONAL, -- Need OP
   dl-PRS-ResourceTimeGap-r16         ENUMERATED {s1, s2, s4, s8, s16, s32, ...}
                                                   OPTIONAL, -- Cond Rep
   dl-PRS-NumSymbols-r16              ENUMERATED {n2, n4, n6, n12, ...},
   dl-PRS-MutingOption1-r16           DL-PRS-MutingOption1-r16      OPTIONAL, -- Need OP
   dl-PRS-MutingOption2-r16           DL-PRS-MutingOption2-r16      OPTIONAL, -- Need OP
   dl-PRS-ResourcePower-r16           INTEGER (-60..50),
   dl-PRS-ResourceList-r16            SEQUENCE (SIZE (1..nrMaxResourcesPerSet-r16)) OF
                                                   NR-DL-PRS-Resource-r16,
   ...
}
DL-PRS-MutingOption1-r16 ::= SEQUENCE {
   dl-prs-MutingBitRepetitionFactor-r16
                                      ENUMERATED { n1, n2, n4, n8, ... } OPTIONAL, -- Need OP
   nr-option1-muting-r16              NR-MutingPattern-r16,
   ...
}
```

```
DL-PRS-MutingOption2-r16 ::= SEQUENCE {
    nr-option2-muting-r16          NR-MutingPattern-r16,
    ...
}
NR-MutingPattern-r16 ::= CHOICE {
    po2-r16                        BIT STRING (SIZE(2)),
    po4-r16                        BIT STRING (SIZE(4)),
    po6-r16                        BIT STRING (SIZE(6)),
    po8-r16                        BIT STRING (SIZE(8)),
    po16-r16                       BIT STRING (SIZE(16)),
    po32-r16                       BIT STRING (SIZE(32)),
    ...
}
NR-DL-PRS-Resource-r16 ::= SEQUENCE {
    nr-DL-PRS-ResourceID-r16       NR-DL-PRS-ResourceID-r16,
    dl-PRS-SequenceID-r16          INTEGER (0..4095),
    dl-PRS-CombSizeN-AndReOffset-r16  CHOICE {
        n2-r16                     INTEGER (0..1),
        n4-r16                     INTEGER (0..3),
        n6-r16                     INTEGER (0..5),
        n12-r16                    INTEGER (0..11),
        ...
    },
    dl-PRS-ResourceSlotOffset-r16  INTEGER (0..nrMaxResourceOffsetValue-1-r16),
    dl-PRS-ResourceSymbolOffset-r16  INTEGER (0..12),
    dl-PRS-QCL-Info-r16            DL-PRS-QCL-Info-r16            OPTIONAL,
    ...
}
DL-PRS-QCL-Info-r16 ::= CHOICE {
    ssb-r16            SEQUENCE {
        pci-r16                    NR-PhysCellID-r16,
        ssb-Index-r16              INTEGER (0..63),
        rs-Type-r16                ENUMERATED {typeC, typeD, typeC-plus-typeD}
    },
    dl-PRS-r16         SEQUENCE {
        qcl-DL-PRS-ResourceID-r16  NR-DL-PRS-ResourceID-r16,
        qcl-DL-PRS-ResourceSetID-r16  NR-DL-PRS-ResourceSetID-r16,
        TwoStageBeamforming        ENUMERATED {true}              OPTIONAL,
    }
}
NR-DL-PRS-Periodicity-and-ResourceSetSlotOffset-r16 ::= CHOICE {
    scs15-r16          CHOICE {
                n4-r16             INTEGER (0..3),
                n5-r16             INTEGER (0..4),
                n8-r16             INTEGER (0..7),
                n10-r16            INTEGER (0..9),
                n16-r16            INTEGER (0..15),
                n20-r16            INTEGER (0..19),
                n32-r16            INTEGER (0..31),
                n40-r16            INTEGER (0..39),
                n64-r16            INTEGER (0..63),
                n80-r16            INTEGER (0..79),
                n160-r16           INTEGER (0..159),
                n320-r16           INTEGER (0..319),
                n640-r16           INTEGER (0..639),
                n1280-r16          INTEGER (0..1279),
                n2560-r16          INTEGER (0..2559),
                n5120-r16          INTEGER (0..5119),
                n10240-r16         INTEGER (0..10239),
                ...
    },
    scs30-r16          CHOICE {
                n8-r16             INTEGER (0..7),
                n10-r16            INTEGER (0..9),
                n16-r16            INTEGER (0..15),
                n20-r16            INTEGER (0..19),
                n32-r16            INTEGER (0..31),
                n40-r16            INTEGER (0..39),
                n64-r16            INTEGER (0..63),
                n80-r16            INTEGER (0..79),
                n128-r16           INTEGER (0..127),
                n160-r16           INTEGER (0..159),
                n320-r16           INTEGER (0..319),
                n640-r16           INTEGER (0..639),
                n1280-r16          INTEGER (0..1279),
                n2560-r16          INTEGER (0..2559),
                n5120-r16          INTEGER (0..5119),
                n10240-r16         INTEGER (0..10239),
                n20480-r16         INTEGER (0..20479),
```

```
         ...
    },
    scs60-r16       CHOICE {
                       n16-r16         INTEGER (0..15),
                       n20-r16         INTEGER (0..19),
                       n32-r16         INTEGER (0..31),
                       n40-r16         INTEGER (0..39),
                       n64-r16         INTEGER (0..63),
                       n80-r16         INTEGER (0..79),
                       n128-r16        INTEGER (0..127),
                       n160-r16        INTEGER (0..159),
                       n256-r16        INTEGER (0..255),
                       n320-r16        INTEGER (0..319),
                       n640-r16        INTEGER (0..639),
                       n1280-r16       INTEGER (0..1279),
                       n2560-r16       INTEGER (0..2559),
                       n5120-r16       INTEGER (0..5119),
                       n10240-r16      INTEGER (0..10239),
                       n20480-r16      INTEGER (0..20479),
                       n40960-r16      INTEGER (0..40959),
                       ...
    },
    scs120-r16      CHOICE {
                       n32-r16         INTEGER (0..31),
                       n40-r16         INTEGER (0..39),
                       n64-r16         INTEGER (0..63),
                       n80-r16         INTEGER (0..79),
                       n128-r16        INTEGER (0..127),
                       n160-r16        INTEGER (0..159),
                       n256-r16        INTEGER (0..255),
                       n320-r16        INTEGER (0..319),
                       n512-r16        INTEGER (0..511),
                       n640-r16        INTEGER (0..639),
                       n1280-r16       INTEGER (0..1279),
                       n2560-r16       INTEGER (0..2559),
                       n5120-r16       INTEGER (0..5119),
                       n10240-r16      INTEGER (0..10239),
                       n20480-r16      INTEGER (0..20479),
                       n40960-r16      INTEGER (0..40959),
                       n81920-r16      INTEGER (0..81919),
                       ...
    },
    ...
}
-- ASN1STOP
```

Two-stage beam sweeping for DL-AoD may be provided by performing one or both of the following techniques. In one embodiment, the LMF may request a UE to perform RSRP measurements on a specific list of PRS resources that belong to different PRS resource sets from the same TRP. Alternatively, a new QCL relationship may be used (that is indicated by a new IE included in existing IE PRS-QCL-Info) in which a UE measures the QCL source PRS resources in one PRS resource set for wide beams and all the corresponding PRS resources that are QCLed with the source PRS resources in another PRS resource set for narrow beams.

Latency Improvements for Rel-17 NR Positioning Measurement Reporting with Configured Grant In one embodiment, a Configured Grant (CG) may be used to report location measurements to eliminate a latency associated with sending a Scheduling Request (SR). For instance, for TDOA, a CG to report RSTD may be configured with the same periodicity as a PRS, and may be scheduled immediately after the PRS, taking into account any measurement processing delay. A UE may then use the CG to report the RSTD. For other techniques, a similar reporting may be used. Additionally, given that CG type 1 may involve relatively less overhead because no DCI may be needed for activation/deactivation, CG type 1 may be selected. In one embodiment, the network may configure a CG type 1 for measurement reporting for Rel-17 positioning.

Figure 4:
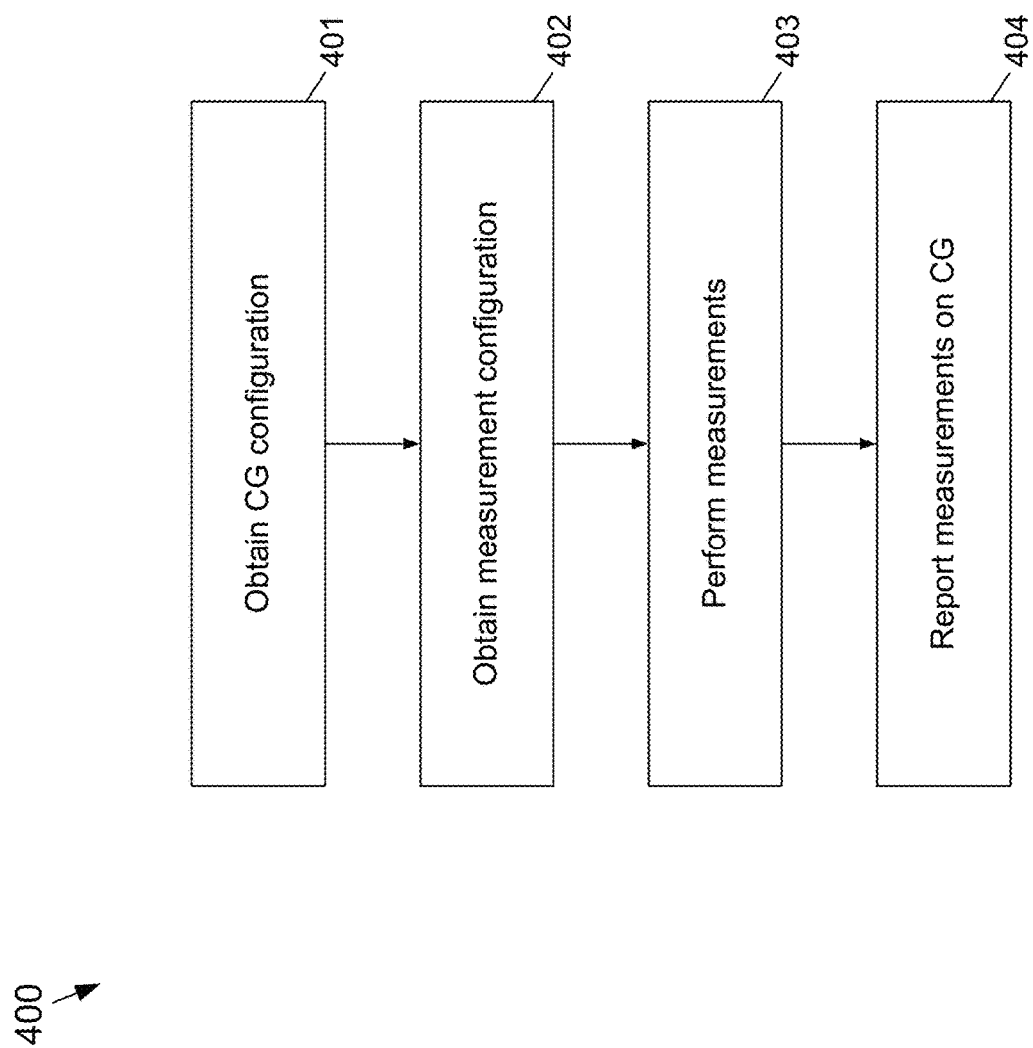
FIG. 4 is a flowchart of an example embodiment of a method for a UE to use a configured grant to report measurement positioning according to the subject matter disclosed herein.

FIG. 4 is a flowchart of an example embodiment of a method 400 for a UE to use a configured grant to report measurement positioning according to the subject matter disclosed herein. At 401, a UE receives a CG configuration from a gNB by, for example, receiving a ConfiguredGrantConfig in which the CG may be uniquely referenced. In one embodiment, if the configuredGrantConfigIndex includes a specific, predetermined value (e.g., 63), the UE may know that the CG is used for reporting location information. In another embodiment, the configuredGrantConfigIndex may have any value, in which case the linkage between the CG and the location information reporting may be done in a Obtain measurement configuration process.

At 402, the UE may receive a configuration for the particular measurements the UE is to perform. Such a configuration message may include some or all of the following: a type of positioning to perform (e.g., TDOA, DL AOD, etc.); a type of measurement to report (e.g., RSTD, angle, RSRP, actual location, etc.); how positioning may be done (e.g., UE-assisted or UE based); and a PRS index (or indices) on which the UE may use to perform the measurements. Additionally, if the configuredGrantConfigIndex is any value other than a predetermined value, the GC index may be included. Otherwise, if the UE knows when specific CG index is to be used, the CG index may be omitted from the configuration message.

The obtained measurement message may originate from the LMF or from a gNB. The message may involve some information exchange between a gNB and LMF. For instance, the CG index may be determined by a gNB. If the LMF sends the configuration of the message, the LMF may receive the CG index from the gNB. Similarly, the CG periodicity may be likely linked to the PRS periodicity/periodicities. Accordingly, a gNB may obtain this information from the LMF.

In one embodiment, operations 401 and 402 may be merged into a single operation. In such a case, the signaling that may be involved may be a message that contains the CG configuration and the measurement configuration (e.g., CGConfigurationForPositioningReporting). An alternative embodiment may include separating the information coming from the gNB and the information coming from the LMF. Yet another alternative embodiment may include three messages as follows. A ConfiguredGrantConfig message may be received from a gNB. A measurement configuration message from the LMF. A third message may be received from the gNB indicating the linkage between the configured grant and the measurement message from the LMF. This may be a message that indicates a configured grant index (i), and a measurement configuration index (j). By receiving the third message, the UE knows that the UE is to report the measurements associated with j on CG indexed by i.

At 403, the UE performs the measurements that have been indicated by the measurement configuration message(s). At 404, the UE uses the CG associated with the measurement configuration to report the measurements that may be used by the network.

M-Sample Measurement

Figure 5:
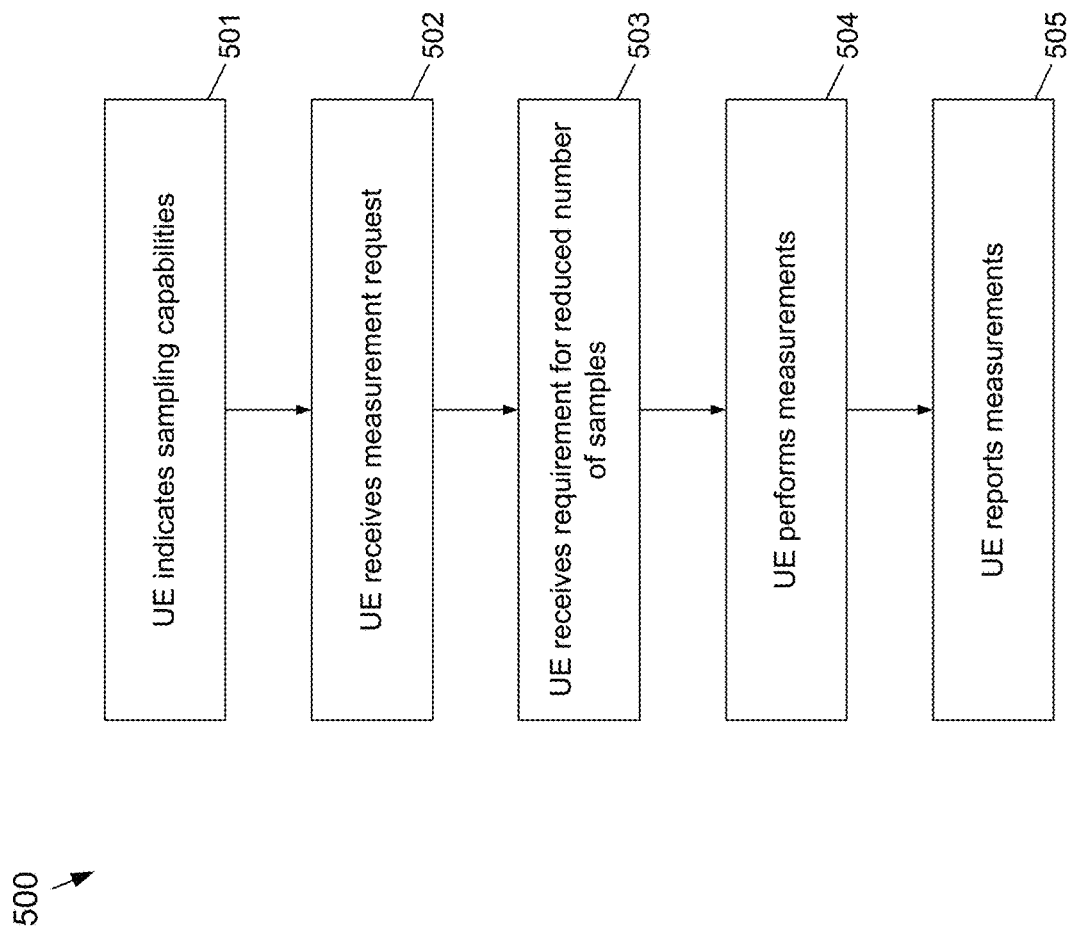
FIG. 5 is a flowchart of an example embodiment of a method for a UE to perform a measurement using a reduced number of samples according to the subject matter disclosed herein.

An M-sample measurement may rely on having further signaling to indicate either the number of samples to use for averaging or reporting the number of used samples. Additionally, a description of UE behavior to operate with a variable number of samples follows. FIG. 5 is a flowchart of an example embodiment of a method 500 for a UE to perform a measurement using a reduced number of samples according to the subject matter disclosed herein.

At 501, a UE indicates the sampling capabilities of the UE by sending a message to a gNB. UEs operating under Rel-16 use a sample size of 4. Thus, using a variable number of samples may be indicated by a capability of a UE, which is a new signaling and is independent from the existing Rel-16 UE capability for positioning measurement. The new capability signaling may be optional, and if the signaling is not present, it means that a UE will use 4 samples for the positioning measurement.

For DL-TDOA, the newly introduced UE capability may be included in IE NR-DL-TDOA-MeasurementCapability that defines the DL-TDOA measurement capability of the UE. One example of the new capability signaling may be an IE LessThan4SamplesforMeasurement, which indicates whether a UE supports performing measurement with less than 4 samples for positioning. Another example of the capability signaling may be that an IE that indicates the minimum number of samples that the UE may use for positioning measurement, i.e., IE NumberofSamplesforMeasurement with a integer value ranging from {1, 2, 3, 4}. An example IE NumberofSamplesforMeasurement is shown below.

```
-- ASN1START
NR-DL-TDOA-MeasurementCapability-r16 ::= SEQUENCE {
    dl-RSTD-MeasurementPerPairOfTRP-FR1-r16    INTEGER (1..4),
    dl-RSTD-MeasurementPerPairOfTRP-FR2-r16    INTEGER (1..4),
    supportOfDL-PRS-RSRP-MeasFR1-r16           ENUMERATED { supported} OPTIONAL,
    supportOfDL-PRS-RSRP-MeasFR2-r16           ENUMERATED { supported} OPTIONAL,
    LessThan4SamplesforMeasurement             ENUMERATED { supported} OPTIONAL,
    ...
}
-- ASN1STOP
```

For DL-AoD, the newly introduced UE capability may be included in IE NR-DL-AoD-MeasurementCapability that defines the DL-AoD measurement capability. An example of an IE NR-DL-AoD-MeasurementCapability is shown below.

```
-- ASN1START
NR-DL-AoD-MeasurementCapability-r16 ::= SEQUENCE {
    maxDL-PRS-RSRP-MeasurementFR1-r16    INTEGER (1..8),
    maxDL-PRS-RSRP-MeasurementFR2-r16    INTEGER (1..8),
    LessThan4SamplesforMeasurement          ENUMERATED { supported} OPTIONAL,
    dl-AoD-MeasCapabilityBandList-r16       SEQUENCE (SIZE (1..nrMaxBands-r16)) OF
                                              DL-AoD-MeasCapabilityPerBand-r16,
    ...
}
DL-AoD-MeasCapabilityPerBand-r16 ::= SEQUENCE {
    freqBandIndicatorNR-r16           FreqBandIndicatorNR-r16,
    simul-NR-DL-AoD-DL-TDOA-r16       ENUMERATED { supported} OPTIONAL,
    simul-NR-DL-AoD-Multi-RTT-r16     ENUMERATED { supported} OPTIONAL,
    ...
}
-- ASN1STOP
```

For Multi-RTT, a newly introduced UE capability may be included in IE NR-Multi-RTT-MeasurementCapability, which defines the Multi-RTT measurement capability. An example of a IE NR-Multi-RTT-MeasurementCapability is shown below.

```
-- ASN1START
NR-Multi-RTT-MeasurementCapability-r16 ::= SEQUENCE {
    maxNrOfRx-TX-MeasFR1-r16        INTEGER (1..4) OPTIONAL,
    maxNrOfRx-TX-MeasFR2-r16        INTEGER (1..4) OPTIONAL,
    supportOfRSRP-MeasFR1-r16       ENUMERATED { supported} OPTIONAL,
    supportOfRSRP-MeasFR2-r16       ENUMERATED { supported} OPTIONAL,
    srs-AssocPRS-MultiLayersFR1-r16 ENUMERATED { supported} OPTIONAL,
    srs-AssocPRS-MultiLayersFR2-r16 ENUMERATED { supported} OPTIONAL,
    LessThan4SamplesforMeasurement  ENUMERATED { supported} OPTIONAL,
    ...
}
-- ASN1STOP
```

For a LTE positioning method OTDOA, UE capability signaling for number of samples for RSTD measurement may be included in IE OTDOA-ProvideCapabilities.

At 502, a measurement request may be sent by the LMF through a gNB. In one embodiment, the measurement request may be the same as the existing measurement request. In the current specification, the location measurement request may be included in the IE NR-DL-TDOA-RequestLocationInformation, IE NR-DL-AoD-RequestLocationInformation, IE NR-Multi-RTT-RequestLocationInformation for positioning methods DL-TDOA, DL-AoD, and Multi-RTT separately. These IEs may be used by a location server to request NR location measurements from a target device. An example of a detailed signaling is shown below:

```
-- ASN1START
NR-DL-TDOA-RequestLocationInformation-r16 ::= SEQUENCE {
    nr-DL-PRS-RstdMeasurementInfoRequest-r16    ENUMERATED { true }
    OPTIONAL,-- Need ON
    nr-RequestedMeasurements-r16                BIT STRING { prsrsrpReq (0) }
    (SIZE(1..8)),
    nr-AssistanceAvailability-r16               BOOLEAN,
    nr-DL-TDOA-ReportConfig-r16                 NR-DL-TDOA-ReportConfig-r16  OPTIONAL,
    -- Need ON
    additionalPaths-r16                         ENUMERATED { requested }     OPTIONAL,
    -- Need ON
    ...
}
NR-DL-TDOA-ReportConfig-r16 ::= SEQUENCE {
    maxDL-PRS-RSTD-MeasurementsPerTRPPair-r16   INTEGER (1..4)               OPTIONAL,
    -- Need ON
    timingReportingGranularityFactor-r16        INTEGER (0..5)               OPTIONAL,
    -- Need ON
    ...
}
-- ASN1STOP
```

50

```
-- ASN1START
NR-DL-AoD-RequestLocationInformation-r16 ::= SEQUENCE {
    nr-AssistanceAvailability-r16               BOOLEAN,
    nr-DL-AoD-ReportConfig-r16                  NR-DL-AoD-ReportConfig-r16,
    ...
}
NR-DL-AoD-ReportConfig-r16 ::= SEQUENCE {
    maxDL-PRS-RSRP-MeasurementsPerTRP-r16       INTEGER (1..8)  OPTIONAL,
    ...
}
-- ASN1STOP
```

```
-- ASN1START
NR-Multi-RTT-RequestLocationInformation-r16 ::= SEQUENCE {
  nr-UE-RxTxTimeDiffMeasurementInfoRequest-r16
                                    ENUMERATED { true }      OPTIONAL, --
Need ON
  nr-RequestedMeasurements-r16      BIT STRING { prsrsrpReq(0)} (SIZE(1..8)),
  nr-AssistanceAvailability-r16     BOOLEAN,
  nr-Multi-RTT-ReportConfig-r16     NR-Multi-RTT-ReportConfig-r16,
  additionalPaths-r16               ENUMERATED { requested }  OPTIONAL, --
Need ON
  ...
}
NR-Multi-RTT-ReportConfig-r16 ::= SEQUENCE {
  maxDL-PRS-RxTxTimeDiffMeasPerTRP-r16   INTEGER (1..4)       OPTIONAL, --
Need ON
  timingReportingGranularityFactor-r16   INTEGER (0..5)       OPTIONAL -
- Need ON
}
-- ASN1STOP
```

At 503, the UE receives an indication of the number of samples that are to be used for a measurement. A UE may be configured by RRC signaling to use a predetermined number of samples through a new message. The number of samples may be configured on a per-cell basis. In such a case, the number of samples may be sent in an IE SIBpos. The IE SIBpos specified in TS 38.331 is shown below as an example:

| SIBpos information element |
|---|
| ```
-- ASN1START
-- TAG-SIPOS-START
SIBpos-r16 ::= SEQUENCE {
  assistanceDataSIB-Element-r16   OCTET STRING,
  lateNonCriticalExtension        OCTET STRING   OPTIONAL,
  ...
}
-- TAG-SIPOS-STOP
-- ASN1STOP
``` |

The number of samples to use may be provided in a lookup table in which the lookup table includes conditions linked to the number of samples to use. For instance, using an example of SINR threshold, the table could include the following information.
  For PRS RSRP lower that X1, the UE uses 4 samples,
  Else, for PRS RSRP greater than X1, but lower than X2, the UE uses 3 samples,
  Else, for PRS RSRP greater than X2, but lower than X3, the UE uses 2 samples,
  Else, use 1 sample,
in which the SINR thresholds X1<X2<X3.

While described herein as depending on a single parameter, a lookup table may include other parameters such as whether a UE experiences likely LOS conditions or not; the number of receive antennas, etc. The lookup table may be indicated by either common or dedicated RRC signaling. Alternatively, a lookup table may not be signaled, either fully or in part, but may be linked to the capability of a UE. For example, if a UE indicates a particular capability X, then it would mean the UE uses a pre-determined lookup table allocated with the particular capability X.

At 504, a UE performs the RSDT measurement, a UE Rx-Tx time difference measurement, and PRS-RSRP measurement for DL-TDOA, DL-AoD, and Multi-RTT using the number of samples according to the configured sampling configuration. If the LMF provides the maximum number of samples to use for positioning measurement, a UE follows the LMF instructions, and perform the measurement with the number of samples less than the maximum number provide by LMF if UE supports fast measurement with sample number less than 4. Otherwise, the UE performs the measurement with the number of samples based on the configuration for sampling and the current channel condition. At 505, if a UE uses less than 4 samples for measurement, the UE reports the number of samples used in the measurement report.

That is, the UE indicates the number of samples used for measurement in the reporting. For an implementation of a timing-based method including DL-TDOA, DL-AoD and Multi-RTT, a UE may indicate the number of samples used for the positioning measurement in the measurement reporting. Specifically, for DL-TDOA positioning, a new IE nr-NumberofSamples may be included in an IE NR-DL-TDOA-SignalMeasurementInformation, as shown as an example in Table. For Multi-RTT, a new IE nr-NumberofSamples may be included in an IE NR-Multi-RTT-SignalMeasurementInformation, as shown as an example in Table 1. For DL-AoD, a new IE may be included in IENR-DL-AoD-SignalMeasurementInformation, as shown as an example in Table.

The indication signaling may be optional for UE measurement reporting, and if an indication is not indicated, then by default the number of samples used for timing measurement is 4 based on a legacy design. Furthermore, the indicated number of samples for each measurement may serve as a reliability criteria at the LMF to determine the quality of the reported measurement, i.e., the more samples that are used for measurement, the more reliable the measurement results. Another option may be that a UE using a binary flag to indicate whether the UE uses less than 4 samples for measurement. The corresponding IE could be LessThan4Samples that takes values of TRUE or FALSE, respectively corresponding to the number of samples being less than 4 and equal to 4.

TABLE 1

IE indicating number of samples for DL-TDOA.

```
-- ASN1START
NR-DL-TDOA-SignalMeasurementInformation-r16 ::= SEQUENCE {
    dl-PRS-ReferenceInfo-r16            DL-PRS-ID-Info-r16,
    nr-DL-TDOA-MeasList-r16             NR-DL-TDOA-MeasList-r16,
    ...
}
NR-DL-TDOA-MeasList-r16 ::= SEQUENCE (SIZE(1..nrMaxTRPs-r16)) OF NR-DL-TDOA-MeasElement-r16
NR-DL-TDOA-MeasElement-r16 ::= SEQUENCE {
    dl-PRS-ID-r16                       INTEGER (0..255),
    nr-PhysCellID-r16                   NR-PhysCellID-r16                   OPTIONAL,
    nr-CellGlobalID-r16                 NCGI-r15                            OPTIONAL,
    nr-ARFCN-r16                        ARFCN-ValueNR-r15                   OPTIONAL,
    nr-DL-PRS-ResourceID-r16            NR-DL-PRS-ResourceID-r16            OPTIONAL,
    nr-DL-PRS-ResourceSetID-r16         NR-DL-PRS-ResourceSetID-r16         OPTIONAL,
    nr-TimeStamp-r16                    NR-TimeStamp-r16,
    nr-RSTD-r16                         CHOICE {
        k0-r16                              INTEGER (0..1970049),
        k1-r16                              INTEGER (0..985025),
        k2-r16                              INTEGER (0..492513),
        k3-r16                              INTEGER (0..246257),
        k4-r16                              INTEGER (0..123129),
        k5-r16                              INTEGER (0..61565),
        ...
    },
    nr-NumberofSamples                  INTEGER (1,2,3)                     OPTIONAL,
    nr-AdditionalPathList-r16           NR-AdditionalPathList-r16           OPTIONAL,
    nr-TimingQuality-r16                NR-TimingQuality-r16,
    nr-DL-PRS-RSRP-Result-r16           INTEGER (0..126)                    OPTIONAL,
    nr-DL-TDOA-AdditionalMeasurements-r16
                                        NR-DL-TDOA-AdditionalMeasurements-r16  OPTIONAL,
    ...
}
NR-DL-TDOA-AdditionalMeasurements-r16 ::= SEQUENCE (SIZE (1..3)) OF
                                            NR-DL-TDOA-AdditionalMeasurementElement-r16
NR-DL-TDOA-AdditionalMeasurementElement-r16 ::= SEQUENCE {
    nr-DL-PRS-ResourceID-r16            NR-DL-PRS-ResourceID-r16            OPTIONAL,
    nr-DL-PRS-ResourceSetID-r16         NR-DL-PRS-ResourceSetID-r16         OPTIONAL,
    nr-TimeStamp-r16                    NR-TimeStamp-r16,
    nr-RSTD-ResultDiff-r16              CHOICE {
        k0-r16                              INTEGER (0..8191),
        k1-r16                              INTEGER (0..4095),
        k2-r16                              INTEGER (0..2047),
        k3-r16                              INTEGER (0..1023),
        k4-r16                              INTEGER (0..511),
        k5-r16                              INTEGER (0..255),
        ...
    },
    nr-NumberofSamples                  INTEGER (1,2,3)                     OPTIONAL,
    nr-TimingQuality-r16                NR-TimingQuality-r16,
    nr-DL-PRS-RSRP-ResultDiff-r16       INTEGER (0..61)                     OPTIONAL,
    nr-AdditionalPathList-r16           NR-AdditionalPathList-r16           OPTIONAL,
    ...
}
-- ASN1STOP
```

TABLE 1

IE indicating number of samples for Multi-RTT.

```
-- ASN1START
NR-Multi-RTT-SignalMeasurementInformation-r16 ::= SEQUENCE {
    nr-Multi-RTT-MeasList-r16           NR-Multi-RTT-MeasList-r16,
    nr-NTA-Offset-r16                   ENUMERATED { nTA1, nTA2, nTA3, nTA4, ... }
    OPTIONAL,
    ...
}
NR-Multi-RTT-MeasList-r16 ::= SEQUENCE (SIZE(1..nrMaxTRPs-r16)) OF NR-Multi-RTT-
MeasElement-r16
NR-Multi-RTT-MeasElement-r16 ::= SEQUENCE {
    dl-PRS-ID-r16                       INTEGER (0..255),
    nr-PhysCellID-r16                   NR-PhysCellID-r16
    OPTIONAL,
    nr-CellGlobalID-r16                 NCGI-r15
    OPTIONAL,
    nr-ARFCN-r16                        ARFCN-ValueNR-r15
```

TABLE 1-continued

IE indicating number of samples for Multi-RTT.

```
    OPTIONAL,
    nr-DL-PRS-ResourceID-r16        NR-DL-PRS-ResourceID-r16
    OPTIONAL,
    nr-DL-PRS-ResourceSetID-r16     NR-DL-PRS-ResourceSetID-r16
    OPTIONAL,
    nr-UE-RxTxTimeDiff-r16          CHOICE {
        k0-r16                          INTEGER (0..1970049),
        k1-r16                          INTEGER (0..985025),
        k2-r16                          INTEGER (0..492513),
        k3-r16                          INTEGER (0..246257),
        k4-r16                          INTEGER (0..123129),
        k5-r16                          INTEGER (0..61565),
        ...
    },
    nr-NumberofSamples              INTEGER (1,2,3)             OPTIONAL,
    nr-AdditionalPathList-r16       NR-AdditionalPathList-r16
    OPTIONAL,
    nr-TimeStamp-r16                NR-TimeStamp-r16,
    nr-TimingQuality-r16            NR-TimingQuality-r16,
    nr-DL-PRS-RSRP-Result-r16       INTEGER (0..126)
    OPTIONAL,
    nr-Multi-RTT-AdditionalMeasurements-r16
                                    NR-Multi-RTT-AdditionalMeasurements-r16
    OPTIONAL,
    ...
}
NR-Multi-RTT-AdditionalMeasurements-r16 ::= SEQUENCE (SIZE (1..3)) OF
                                    NR-Multi-RTT-AdditionalMeasurementElement-r16
NR-Multi-RTT-AdditionalMeasurementElement-r16 ::= SEQUENCE {
    nr-DL-PRS-ResourceID-r16        NR-DL-PRS-ResourceID-r16
    OPTIONAL,
    nr-DL-PRS-ResourceSetID-r16     NR-DL-PRS-ResourceSetID-r16
    OPTIONAL,
    nr-DL-PRS-RSRP-ResultDiff-r16   INTEGER (0..61)
    OPTIONAL,
    nr-UE-RxTxTimeDiffAdditional-r16  CHOICE {
        k0-r16                          INTEGER (0..8191),
        k1-r16                          INTEGER (0..4095),
        k2-r16                          INTEGER (0..2047),
        k3-r16                          INTEGER (0..1023),
        k4-r16                          INTEGER (0..511),
        k5-r16                          INTEGER (0..255),
        ...
    },
    nr-NumberofSamples              INTEGER (1,2,3)             OPTIONAL,
    nr-TimingQuality-r16            NR-TimingQuality-r16,
    nr-AdditionalPathList-r16       NR-AdditionalPathList-r16
    OPTIONAL,
    nr-TimeStamp-r16                NR-TimeStamp-r16,
    ...
}
-- ASN1STOP
```

TABLE 3

IE indicating number of samples for DL-AoD.

```
-- ASN1START
NR-DL-AoD-SignalMeasurementInformation-r16 ::= SEQUENCE {
    nr-DL-AoD-MeasList-r16          NR-DL-AoD-MeasList-r16,
    ...
}
NR-DL-AoD-MeasList-r16 ::= SEQUENCE (SIZE(1..nrMaxTRPs-r16)) OF NR-DL-AoD-MeasElement-r16
NR-DL-AoD-MeasElement-r16 ::= SEQUENCE {
    dl-PRS-ID-r16                   INTEGER (0..255),
    nr-PhysCellID-r16               NR-PhysCellID-r16           OPTIONAL,
    nr-CellGlobalID-r16             NCGI-r15                    OPTIONAL,
    nr-ARFCN-r16                    ARFCN-ValueNR-r15           OPTIONAL,
    nr-DL-PRS-ResourceID-r16        NR-DL-PRS-ResourceID-r16    OPTIONAL,
    nr-DL-PRS-ResourceSetID-r16     NR-DL-PRS-ResourceSetID-r16 OPTIONAL,
    nr-TimeStamp-r16                NR-TimeStamp-r16,
    nr-DL-PRS-RSRP-Result-r16       INTEGER (0..126),
```

TABLE 3-continued

| IE indicating number of samples for DL-AoD. | | |
|---|---|---|
| nr-NumberofSamples | INTEGER (1,2,3) | OPTIONAL, |
| nr-DL-PRS-RxBeamIndex-r16 | INTEGER (1..8) | OPTIONAL, |
| nr-DL-AoD-AdditionalMeasurements-r16 | | |
| | NR-DL-AoD-AdditionalMeasurements-r16 | OPTIONAL, |
| ... | | |
| } | | |
| NR-DL-AoD-AdditionalMeasurements-r16 ::= SEQUENCE (SIZE (1..7)) OF | | |
| | NR-DL-AoD- | |
| AdditionalMeasurementElement-r16 | | |
| NR-DL-AoD-AdditionalMeasurementElement-r16 ::= SEQUENCE { | | |
| nr-DL-PRS-ResourceID-r16 | NR-DL-PRS-ResourceID-r16 | OPTIONAL, |
| nr-DL-PRS-ResourceSetID-r16 | NR-DL-PRS-ResourceSetID-r16 | OPTIONAL, |
| nr-TimeStamp-r16 | NR-TimeStamp-r16, | |
| nr-DL-PRS-RSRP-ResultDiff-r16 | INTEGER (0..30), | |
| nr-NumberofSamples | INTEGER (1,2,3) | OPTIONAL, |
| nr-DL-PRS-RxBeamIndex-r16 | INTEGER (1..8) | OPTIONAL, |
| ... | | |
| } | | |
| -- ASN1STOP | | |

In one embodiment, a UL may indicate to the LMF in a measurement report the number of samples used for the corresponding RSDT, a UL Rx-Tx difference, and PRS-RSRP measurement for NR positioning methods DL-TDOA, Multi-RTT and DL-AoD.

UL behavior using a reduced number of samples (i.e., less than 4 samples) for measurement may be either requested by the LMF or decided by UL implementation. If a UL decides the number of samples for measurement itself, the UL satisfies the measurement accuracy requirement first. Under the condition that the measurement accuracy has been satisfied, a UE may use as few a number of samples as possible for measurement.

If the LMF requests a UE to use reduced number of samples for measurement due to a latency requirement, the UE may select to report only the values for which the number of samples are sufficient to satisfy the accuracy requirement. Alternatively, the UE may provide two reports at different times in which a first report is based on a limited number of samples (as indicated by the LMF), followed by a second report that is based on full accuracy (4 samples). Additionally, if the first report is of sufficient accuracy, a UE may indicate the sufficient accuracy when sending the first report (either explicitly or implicitly) and may skip sending a second report altogether. Still another alternative provides that a UE may strictly follows the LMF request and use the number of sample specified by LMF for measurement. If the UE strictly follows the LMF request, the UE does not include the number of samples for measurement in the report.

LMF Signaling Changes

New signaling may be used for the LMF. If the latency requirement is the highest priority, or the LMF/gNB detects that the channel conditions are good, the LMF may also request a UE to reduce the number of samples for timing measurement to reduce latency. In such a situation, a UE may first report a capability of supporting the reduced number of samples (i.e., number of samples for measurement is less than 4). If a reduced number of samples for measurement is supported by the UE, the LMF may inform the UE the number of samples that are to be used for measurement depending the latency requirement and/or channel conditions. New signaling may be introduced for this purpose, which may be included in the existing IE RequestLocationInformation. For example, a new IE NumberofSamplesPerMeasurement may be included in IE NR-DL-TDOA-RequestLocationInformation for a DL-TDOA method, as shown as an example in Table 4; or in an IE NR-Multi-RTT-RequestLocationInformation for a Multi-RTT method, as shown as an example in Table 5; or in an IE NR-DL-AoD-RequestLocation Information for a DL-AoD, as shown as an example in Table 6. If an IE for reduced number of samples is not present, it means that a UE may decide the number of samples used by itself given that a reduced number of sample requirement has been configured by RRC signalling.

TABLE 2

| IE for reduced number of samples request by LMF for DL-TDOA. | | |
|---|---|---|
| -- ASN1START | | |
| NR-DL-TDOA-RequestLocationInformation-r16 ::= SEQUENCE { | | |
| nr-DL-PRS-RstdMeasurementInfoRequest-r16 | ENUMERATED { true } | OPTIONAL,-- Need ON |
| nr-RequestedMeasurements-r16 | BIT STRING { prsrsrpReq (0) } (SIZE(1..8)), | |
| NumberofSamplesPerMeasurement | INTEGER (1,2,3) | OPTIONAL, |
| nr-AssistanceAvailability-r16 | BOOLEAN, | |
| nr-DL-TDOA-ReportConfig-r16 | NR-DL-TDOA-ReportConfig-r16 | OPTIONAL, -- Need ON |
| additionalPaths-r16 | ENUMERATED { requested } | OPTIONAL, -- Need ON |
| ... | | |
| } | | |
| NR-DL-TDOA-ReportConfig-r16 ::= SEQUENCE { | | |
| maxDL-PRS-RSTD-MeasurementsPerTRPPair-r16 | INTEGER (1..4) | OPTIONAL, -- Need |

TABLE 2-continued

IE for reduced number of samples request by LMF for DL-TDOA.

```
ON
   timingReportingGranularityFactor-r16        INTEGER (0..5)              OPTIONAL, -- Need
ON
   ...
}
-- ASN1STOP
```

TABLE 5

IE for reduced number of samples request by LMF for Multi-RTT.

```
-- ASN1START
NR-Multi-RTT-RequestLocationInformation-r16 ::= SEQUENCE {
   nr-UE-RxTxTimeDiffMeasurementInfoRequest-r16
                                               ENUMERATED { true }         OPTIONAL, -- Need ON
   nr-RequestedMeasurements-r16                BIT STRING { prsrsrpReq(0)} (SIZE(1..8)),
   NumberofSamplesPerMeasurement               INTEGER (1,2,3)             OPTIONAL,
   nr-AssistanceAvailability-r16               BOOLEAN,
   nr-Multi-RTT-ReportConfig-r16               NR-Multi-RTT-ReportConfig-r16,
   additionalPaths-r16                         ENUMERATED { requested }    OPTIONAL, -- Need ON
   ...
}
NR-Multi-RTT-ReportConfig-r16 ::= SEQUENCE {
   maxDL-PRS-RxTxTimeDiffMeasPerTRP-r16        INTEGER (1..4)              OPTIONAL, -- Need ON
   timingReportingGranularityFactor-r16        INTEGER (0..5)              OPTIONAL -- Need ON
}
-- ASN1STOP
```

TABLE 6

IE for reduced number of samples request by LMF for DL-AoD.

```
-- ASN1START
NR-DL-AoD-RequestLocationInformation-r16 ::= SEQUENCE {
   nr-AssistanceAvailability-r16               BOOLEAN,
   nr-DL-AoD-ReportConfig-r16                  NR-DL-AoD-ReportConfig-r16,
   NumberofSamplesPerMeasurement               INTEGER (1,2,3)   OPTIONAL,
   ...
}
NR-DL-AoD-ReportConfig-r16 ::= SEQUENCE {
   maxDL-PRS-RSRP-MeasurementsPerTRP-r16       INTEGER (1..8)    OPTIONAL, -- Need ON
   ...
}
-- ASN1STOP
```

LMF may inform UE the number of samples to use for the RSTD, UE Rx-Tx time difference and PRS-RSRP measurements in IE RequestLocationInformation.

Figure 6:
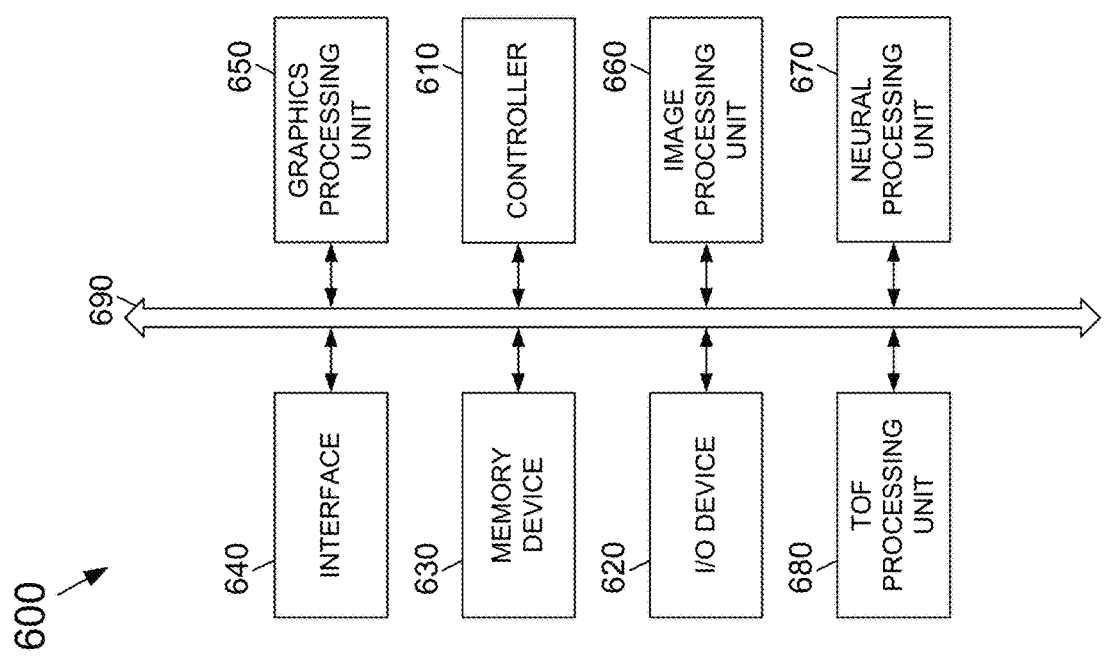
FIG. 6 depicts an electronic device that may be configured to reduce Rx/Tx timing errors, to increase positioning accuracy by mitigating NLOS errors, to perform two-stage beam sweeping for DL-AoD, and/or to perform M-sample measurements to improve latency reporting in connection with position reporting according to the subject matter disclosed herein.

FIG. 6 depicts an electronic device 600 that may, in one embodiment, be configure to reduce Rx/Tx timing errors as disclosed herein. In another embodiment, the electronic device 600 may be configured to increase positioning accuracy by mitigating NLOS errors as disclosed herein. In still another embodiment, the electronic device 600 may be configured to perform two-stage beam sweeping for DL-AoD as disclosed herein. In yet another embodiment, the electronic device 600 may be configured for M-sample measurements to improve latency reporting in connection with position reporting as disclosed herein.

Electronic device 600 and the various system components of electronic device 600 may be formed from one or more modules. The electronic device 600 may include a controller (or CPU) 610, an input/output device 620 such as, but not limited to, a keypad, a keyboard, a display, a touch-screen display, a 2D image sensor, a 3D image sensor, a memory 630, an interface 640, a GPU 650, an imaging-processing unit 660, a neural processing unit 670, a TOF processing unit 680 that are coupled to each other through a bus 690. In one embodiment, the 2D image sensor, the 3D image sensor and/or the non-contact thermal sensor may be part of the imaging processing unit 660. The controller 610 may include, for example, at least one microprocessor, at least one digital signal processor, at least one microcontroller, or the like. The memory 630 may be configured to store a command code to be used by the controller 610 and/or to store a user data.

The interface 640 may be configured to include a wireless interface that is configured to transmit data to or receive data from, for example, a wireless communication network using a RF signal. The wireless interface 640 may include, for example, an antenna. The electronic system 600 also may be used in a communication interface protocol of a communication system, such as, but not limited to, Code Division Multiple Access (CDMA), Global System for Mobile Communications (GSM), North American Digital Communications (NADC), Extended Time Division Multiple Access (E-TDMA), Wideband CDMA (WCDMA), CDMA2000, Wi-Fi, Municipal Wi-Fi (Muni Wi-Fi), Bluetooth, Digital Enhanced Cordless Telecommunications (DECT), Wireless Universal Serial Bus (Wireless USB), Fast low-latency access with seamless handoff Orthogonal Frequency Division Multiplexing (Flash-OFDM), IEEE 802.20, General Packet Radio Service (GPRS), iBurst, Wireless Broadband (WiBro), WiMAX, WiMAX-Advanced, Universal Mobile Telecommunication Service-Time Division Duplex (UMTS-TDD), High Speed Packet Access (HSPA), Evolution Data Optimized (EVDO), Long Term Evolution-Advanced (LTE-Advanced), Multichannel Multipoint Distribution Service (MMDS), Fifth-Generation Wireless (5G), Sixth-Generation Wireless (6G), and so forth.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed is:

1. A method to measure position information in a wireless network, the method comprising:
   sending, by a User Equipment (UE), an indication that the UE is capable of a positioning measurement using fewer than four measurement samples;
   receiving, at the UE, a request to make one or more positioning measurements using fewer than four measurement samples or using four measurement samples, the request including an indication of a number of samples that are to be used, wherein the UE is configured to use a predetermined number of samples via the request; and
   sending, by the UE, a measurement report based, at least in part on, a number of measurement samples used to make the positioning measurement.

2. The method of claim 1, wherein the indication that the UE is capable of a positioning measurement with four measurement samples or less than four samples is further based on one or more reported UE capabilities.

3. The method of claim 1, wherein the request to make the one or more positioning measurements is for a Downlink Time Different of Arrival (DL-TDOA) measurement, a multi-cell Round Trip Time (Multi-RTT) measurement, or a Downlink Angle of Departure (DL-AoD) measurement.

4. The method of claim 1, wherein the measurement report includes a Reference Signal Time Difference (RSTD) measurement, a UE Receive-Transmit (Rx-Tx) time difference measurement, or a Positioning Reference Signals-Reference Signal Received Power (PRS-RSRP) measurement.

5. The method of claim 1, further comprising receiving, at the UE, a Configured Grant (GC) type 1 message containing a configuration for the measurement report.

6. A method to measure position information in a wireless network, the method comprising:
   receiving, by a User Equipment (UE), an indication that the wireless network can accept a positioning measurement based on four samples or less samples;
   performing, by the UE, a positioning measurement using fewer than four measurement samples or using four measurement samples, based on a request including an indication of a number of samples that are to be used, wherein the UE is configured to use a predetermined number of samples via the request; and
   sending, by the UE, a measurement report based, at least in part on, a number of measurement samples used to make the positioning measurement.

7. The method of claim 6, wherein the indication that the UE is capable of a positioning measurement with four measurement samples or less than four samples is further based on one or more reported UE capabilities.

8. The method of claim 6, wherein the positioning measurement is for a Downlink Time Different of Arrival (DL-TDOA) measurement, a multi-cell Round Trip Time (Multi-RTT) measurement, or a Downlink Angle of Departure (DL-AoD) measurement.

9. The method of claim 8, wherein the measurement report includes a Reference Signal Time Difference (RSTD) measurement, a UE Receive-Transmit (Rx-Tx) time difference measurement, or a Positioning Reference Signals-Reference Signal Received Power (PRS-RSRP) measurement.

10. The method of claim 6, further comprising receiving, at the UE, a Configured Grant (GC) type 1 message containing a configuration for the measurement report.

11. A system in a wireless network, the system comprising:
   a User Equipment (UE) configured to send to the wireless network an indication that the UE is capable of making a measurement for positioning using fewer than four measurement samples, the UE being further configured to receive a request from the wireless network to make a measurement for positioning using fewer than four measurement samples or using four measurement samples, the request including an indication of a number of samples that are to be used, wherein the UE is configured to use a predetermined number of samples via the request, and to send to the wireless network a measurement report based, at least in part on, a number of measurement samples used to make the measurement for positioning.

12. The system of claim 11, wherein the request to make the measurement for positioning is for a Downlink Time Different of Arrival (DL-TDOA) measurement, a multi-cell Round Trip Time (Multi-RTT) measurement, or a Downlink Angle of Departure (DL-AoD) measurement.

13. The system of claim 11, wherein the measurement for positioning made by UE includes a Reference Signal Time Difference (RSTD) measurement, a UE Receive-Transmit (Rx-Tx) time difference measurement, or a Positioning Reference Signals-Reference Signal Received Power (PRS-RSRP) measurement.

14. The system of claim 11, wherein the UE is further configured to receive a Configured Grant (GC) type 1 message containing a configuration for a report to be used by the UE for a measurement for positioning.

* * * * *